(12) United States Patent
Kikuchi et al.

(10) Patent No.: US 7,648,647 B2
(45) Date of Patent: Jan. 19, 2010

(54) POLYMER/LIQUID CRYSTAL COMPOSITE AND LIQUID CRYSTAL ELEMENT

(75) Inventors: Hirotsugu Kikuchi, Fukuoka (JP); Yasuhiro Haseba, Ichihara (JP)

(73) Assignees: Kyushu University, National University Corporation, Fukuoka (JP); Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 106 days.

(21) Appl. No.: 12/116,749

(22) Filed: May 7, 2008

(65) Prior Publication Data

US 2008/0280071 A1 Nov. 13, 2008

(30) Foreign Application Priority Data

May 8, 2007 (JP) ............... 2007-123522
Apr. 28, 2008 (JP) ............... 2008-117127

(51) Int. Cl.
*C09K 19/00* (2006.01)
*C09K 19/06* (2006.01)
*C09K 19/52* (2006.01)
*G02F 1/1333* (2006.01)
*G02F 1/13* (2006.01)

(52) U.S. Cl. ............... 252/299.01; 252/299.6; 252/299.61; 252/299.62; 252/299.63; 252/299.64; 252/299.65; 252/299.66; 430/20; 428/1.1; 349/1; 349/56; 349/167; 349/193

(58) Field of Classification Search ............ 252/299.01, 252/299.61–66; 430/20; 428/1.1; 349/1, 349/56, 167, 193
See application file for complete search history.

(56) References Cited

U.S. PATENT DOCUMENTS

| | | | |
|---|---|---|---|
| 2009/0051855 A1* | 2/2009 | Haseba | 349/89 |
| 2009/0059132 A1* | 3/2009 | Yamamoto et al. | 349/88 |
| 2009/0059157 A1* | 3/2009 | Haseba et al. | 349/182 |
| 2009/0065739 A1* | 3/2009 | Haseba et al. | 252/299.62 |
| 2009/0135368 A1* | 5/2009 | Haseba et al. | 349/183 |

FOREIGN PATENT DOCUMENTS

JP    2003-327966    11/2003

OTHER PUBLICATIONS

H. Kikuchi et al., "Polymer-Stabilized Liquid Crystal Blue Phases" Nature Materials, 1, pp. 64-68 (Sep. 2, 2002).
Y. Hisakado et al., "Large Electro-Optic Kerr Effect in Polymer-Stabilized Liquid-Crystalline Blue Phases" Advanced Materials, 17, pp. 96-98 (2005).
Y. Haseba et al., "Large Electro-Optic Kerr Effect in Nanostructured Chiral Liquid-Crystal Composited Over a Wide Temperature Range" Advanced Materials, 17, pp. 2311-2315 (2005).

* cited by examiner

*Primary Examiner*—Geraldina Visconti
(74) *Attorney, Agent, or Firm*—Hogan & Hartson LLP

(57) ABSTRACT

The invention is generally related to a polymer/liquid crystal composite, which includes a liquid crystal material which exhibits an optically isotropic liquid crystal phase in the temperature range of approximately 5° C. or more in the elevated temperature process but does not exhibit a nematic phase; and a polymer, and which is used for an element driven in a state of the optically isotropic liquid crystal phase.

36 Claims, 3 Drawing Sheets

US 7,648,647 B2

POLYMER/LIQUID CRYSTAL COMPOSITE AND LIQUID CRYSTAL ELEMENT

This application claims priority under 35 U.S.C. § 119 to Japanese Patent Application Nos. JP 2007-123522 (filed May 8, 2007) and 2008-117127 (filed Apr. 28, 2008) each which applications is expressly incorporated herein by reference in its entirety.

BACKGROUND OF THE INVENTION

1. Field of the Invention

The invention relates to a liquid crystal material contained in a polymer/liquid crystal composite including the liquid crystal material and a polymer for use in an element driven in a state of an optically isotropic liquid crystal phase, wherein the liquid crystal material exhibits the optically isotropic liquid crystal phase in the temperature range of approximately 5° C. or more in the elevated temperature process but does not exhibit a nematic phase; and a mixture comprising a liquid crystal material and a monomer, the polymer/liquid crystal composite and a liquid crystal element using the composite thereof.

2. Related Art

When a nematic liquid crystal compound/composition is heated in a state where a nematic phase is exhibited, an isotropic phase is gradually appeared. In such an isotropic phase in a nematic liquid crystal compound/composition (hereinafter sometimes referred to as "non-liquid crystalline isotropic phase"), the Kerr effect, which is a phenomenon in which a value of electric birefringence $\Delta n_E$ (a value of birefringence induced when electric field is applied on an isotropic medium) is proportional to the square of electric field E [$\Delta n_E = K\lambda E^2$ (K: Kerr constant (Kerr coefficient), $\lambda$: wavelength)], is observed. Specifically, a high Kerr constant is observed at a temperature just above the nematic phase-isotropic phase transition temperature. It is thought that the Kerr effect is attributed to the presence of short range order of nematic molecular alignment generated by heat fluctuation in a non-liquid crystalline isotropic phase.

In the case of a liquid crystal material, the Kerr effect is observed not only in a non-liquid crystalline isotropic phase but also in a blue phase. A blue phase is generally exhibited between a chiral nematic phase and a non-liquid crystalline isotropic phase, and in general, the temperature range thereof is very narrow (about approximately 1 to approximately 2° C.).

On the other hand, in a composite material of a polymer and a chiral liquid crystal, an "optically isotropic liquid crystal phase (a phase in which liquid crystal molecular alignment is macroscopically isotropic, and liquid crystalline order is microscopically present)" is exhibited in a relatively wide temperature range, and in such a phase, the Kerr effect with a high Kerr constant has been observed (for example, see Japanese Laid-Open Patent Publication No. 2003-327966; Nature Materials, 1, 64-68 (2002); Advanced Materials, 17, 96-98 (2005); and Advanced Materials, 17, 2311-2315 (2005)).

However, though an optically isotropic liquid crystal phase is exhibited in a wide temperature range in the case of such a composite material, there is a problem that birefringence may remain even if returning to a liquid crystalline state, in which electric field is not applied, after application of high electric field. Therefore, in the case of liquid crystal elements such as indicating element, use of a composite material with a polymer is limited.

SUMMARY OF THE INVENTION

Under the above-described circumstances, a polymer/liquid crystal composite, in which birefringence does not remain even if returning to a liquid crystalline state, in which electric field is not applied, after application of high electric field, is desired. A liquid crystal material with excellent long-term reliability is desired.

It has been observed that a liquid crystal material, which exhibits an optically isotropic liquid crystal phase (e.g., a blue phase) in a wide temperature range in the elevated temperature process but does not exhibit a nematic phase, can be obtained when chiral dopants are added to a liquid crystal composition, wherein the difference between the upper limit and the lower limit of a temperature allowing coexistence of the nematic phase and a non-liquid crystalline isotropic phase or the difference between the upper limit and the lower limit of a temperature allowing coexistence of a chiral nematic phase and the non-liquid crystalline isotropic phase has a predetermined value, and wherein the optically isotropic liquid crystal phase is not exhibited in the elevated temperature process.

The invention includes:

[1] A liquid crystal material contained in a polymer/liquid crystal composite including the liquid crystal material and a polymer for use in an element driven in a state of an optically isotropic liquid crystal phase, wherein the liquid crystal material exhibits the optically isotropic liquid crystal phase in the temperature range of approximately 4.8° C. or more in the elevated temperature process but does not exhibit a nematic phase.

[2] The liquid crystal material according to item [1], wherein the liquid crystal material is a composition includes a liquid crystal composition A, wherein the difference between the upper limit and the lower limit of a temperature allowing coexistence of the nematic phase and a non-liquid crystalline isotropic phase or the difference between the upper limit and the lower limit of a temperature allowing coexistence of a chiral nematic phase and the non-liquid crystalline isotropic phase is approximately 3.0° C. to approximately 150° C., and wherein the optically isotropic liquid crystal phase is not exhibited in the elevated temperature process, and chiral dopants.

[3] The liquid crystal material according to item [1], wherein the liquid crystal material is a composition includes a liquid crystal composition A, wherein the difference between the upper limit and the lower limit of a temperature allowing coexistence of the nematic phase and a non-liquid crystalline isotropic phase or the difference between the upper limit and the lower limit of a temperature allowing coexistence of a chiral nematic phase and the non-liquid crystalline isotropic phase is approximately 6.0° C. to approximately 150° C., and wherein the optically isotropic liquid crystal phase is not exhibited in the elevated temperature process, and chiral dopants.

[4] The liquid crystal material according to any one of items [1]-[3], wherein the liquid crystal material is the liquid crystal composition B including the liquid crystal composition A, which does not exhibit the optically isotropic liquid crystal phase in the elevated temperature process, and the chiral dopants, and wherein the liquid crystal composition A includes approximately 5 to approximately 80 wt % of component 1 having the clearing point $T_1$ and approximately 20 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geqq 100°$ C.

[5] The liquid crystal material according to any one of items [1]-[3], wherein the liquid crystal material is the liquid crystal composition B including the liquid crystal composition A, which does not exhibit the optically isotropic liquid crystal phase in the elevated temperature process, and the chiral dopants, and wherein the liquid crystal composition A includes approximately 5 to approximately 70 wt % of component 1 having the clearing point $T_1$ and approximately 30 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geqq 150°$ C.

[6] The liquid crystal material according to any one of items [1]-[3], wherein the liquid crystal material is the liquid crystal composition B including the liquid crystal composition A, which does not exhibit the optically isotropic liquid crystal phase in the elevated temperature process, and the chiral dopants, and wherein the liquid crystal composition A includes approximately 5 to approximately 70 wt % of component 1 having the clearing point $T_1$ and approximately 30 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geqq 200°$ C.

[7] The liquid crystal material according to any one of items [1]-[3], wherein the liquid crystal material is the liquid crystal composition B including the liquid crystal composition A, which does not exhibit the optically isotropic liquid crystal phase in the elevated temperature process, and the chiral dopants, and wherein the liquid crystal composition A includes approximately 5 to approximately 80 wt % of component 1 having the clearing point $T_1$ and approximately 20 to approximately 95 wt % of component 2 having the clearing point $T_2$, and the clearing point $T_1$, the clearing point $T_2$ and the clearing point T×a of a liquid crystal composition a, in which all the chiral dopants are excluded from the liquid crystal composition A satisfy the following conditions:

$T_1 > T_2$ $T_1 - T \times a \geqq 100°$ C.

[8] The liquid crystal material according to any one of items [4]-[7], wherein the component 1 includes a liquid crystal compound having the clearing point of approximately 150° C. or higher and the component 2 includes a liquid crystal compound having the clearing point of approximately 47° C. or lower.

The component 1 preferably includes a liquid crystal compound having the clearing point of approximately 200° C. or higher, more preferably includes a liquid crystal compound having the clearing point of approximately 220° C. or higher, and particularly preferably consists of a liquid crystal compound having the clearing point of approximately 250° C. or higher.

The component 2 preferably includes a liquid crystal compound having the clearing point of approximately 25° C. or lower, and particularly preferably includes a liquid crystal compound having the clearing point of approximately 0° C. or lower.

[9] The liquid crystal material according to any one of items [4]-[8], wherein the component 1 includes a compound represented by the following general formula (1):

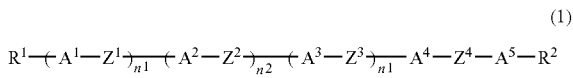

wherein:

$R^1$ is hydrogen or alkyl having 1 to 20 carbon atoms, wherein any —$CH_2$— in the alkyl can be substituted with —O—, —S—, —COO—, —OCO—, —CH=CH—, —CF=CF— or —C≡C—, and any hydrogen in the alkyl and an alkyl in which any —$CH_2$— is substituted with —O—, —S—, —COO—, —OCO—, —CH=CH—, —CF=CF— or —C≡C— can be substituted with halogen;

$R^2$ is hydrogen, halogen, —CN, —N=C=O, —N=C=S, —$CF_3$, —$OCF_3$ or alkyl having 1 to 20 carbon atoms, wherein any —$CH_2$— in the alkyl can be substituted with —O—, —S—, —COO—, —OCO—, —CH=CH—, —CF=CF— or —C≡C—, and any hydrogen in the alkyl and an alkyl in which any —$CH_2$— is substituted with —O—, —S—, —COO—, —OCO—, —CH=CH—, —CF=CF— or —C≡C— can be substituted with halogen, and —$CH_3$ in these alkyls can be substituted with —CN;

$A^1$ to $A^5$ are each independently an aromatic or nonaromatic 3- to 8-membered ring or a condensed ring having 9 or more carbon atoms, wherein: any hydrogen in these rings can be substituted with halogen, alkyl having 1 to 3 carbon atoms or alkyl halide; —$CH_2$— in the rings can be substituted with —O—, —S—, or —NH—; —CH= can be substituted with —N=; and $A^1$ to $A^5$ are not tetrahydropyran rings;

$Z^1$ to $Z^4$ are each independently a single bond or alkylene having 1 to 8 carbon atoms, wherein any —$CH_2$— in the alkylene can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene and an alkylene in which any —$CH_2$— is substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C— can be substituted with halogen; and $n^1$ to $n^3$ are each independently 0 or 1; when $R^2$ is hydrogen or fluorine, $n^2$ and $n^3$ are 1; when at least one of $Z^1$ to $Z^4$ is —$CF_2O$—, $n^2$ and $n^3$ are 1; when $Z^4$ is —COO—, $n^2$ and $n^3$ are 1; and only when at least one of $A^4$ and $A^5$ is a condensed ring having 9 or more carbon atoms, all of $n^1$ to $n^3$ can be 0.

[10] The liquid crystal material according to item [9], wherein:
- $R^1$ is alkyl having 1 to 10 carbon atoms, wherein any —$CH_2$— in the alkyl can be substituted with —O—, —S—, —COO—, —OCO—, —CH=CH— or —C≡C—;
- $R^2$ is halogen, —CN, —N=C=O, —N=C=S, —$CF_3$, —$OCF_3$ or alkyl having 1 to 20 carbon atoms, wherein any —$CH_2$— in the alkyl can be substituted with —O—, —CH=CH— or —C≡C—, and any hydrogen in the alkyl and an alkyl in which any —$CH_2$— is substituted with —O—, —CH=CH— or —C≡C— can be substituted with halogen, and —$CH_3$ in these alkyls can be substituted with —CN;
- $A^1$ to $A^5$ are each independently a benzene ring, a naphthalene ring or a cyclohexane ring, wherein any hydrogen in these rings can be substituted with halogen, alkyl having 1 to 3 carbon atoms or alkyl halide, and —$CH_2$— in the rings can be substituted with —O— or —S—, and —CH= can be substituted with —N=; and
- $Z^1$ to $Z^4$ are each independently a single bond or alkylene having 1 to 4 carbon atoms, wherein any —$CH_2$— in the alkylene can be substituted with —O—, —S—, —COO—, —OCO—, —CSO—, —OCS—, —CH=CH—, —CF=CF— or —C≡C—, and any hydrogen in the alkylene and an alkylene in which any —$CH_2$— is substituted with —O—, —S—, —COO—, —OCO—, —CSO—, —OCS—, —CH=CH—, —CF=CF— or —C≡C— can be substituted with halogen.

[11] The liquid crystal material according to item [9], wherein:
- $R^1$ is alkyl having 1 to 10 carbon atoms, wherein any —$CH_2$— nonadjacent to the aromatic ring in the alkyl can be substituted with —CH=CH—, and any —$CH_2$— in the alkyl or alkenyl can be substituted with —O—;
- $R^2$ is fluorine, chlorine, —CN, —N=C=S or alkyl having 1 to 20 carbon atoms, wherein any —$CH_2$— in the alkyl can be substituted with —O—, —CH=CH— or —C≡C—, and any hydrogen in the alkyl and an alkyl in which any —$CH_2$— is substituted with —O—, —CH=CH— or —C≡C— can be substituted with halogen;
- $A^1$ to $A^5$ are each independently a benzene ring, a naphthalene ring or a cyclohexane ring, wherein any hydrogen in the rings can be substituted with fluorine or chlorine, and —$CH_2$— can be substituted with —O— or —S—, and —CH= can be substituted with —N=; and
- $Z^1$ to $Z^4$ are each independently a single bond, —$CF_2O$— or —C≡C—.

[12] The liquid crystal material according to item [9], wherein:
- $R^1$ is alkyl having 1 to 10 carbon atoms, wherein any —$CH_2$— nonadjacent to the aromatic ring in the alkyl can be substituted with —CH=CH—, and any —$CH_2$— in the alkyl or alkenyl can be substituted with —O—;
- $R^2$ is fluorine, chlorine, —CN or alkyl having 1 to 10 carbon atoms, wherein any —$CH_2$— in the alkyl can be substituted with —O—, and any hydrogen in the alkyl and an alkyl in which any —$CH_2$— is substituted with —O— can be substituted with halogen;
- $A^1$ to $A^5$ are each independently a benzene ring, a dioxane ring or a cyclohexane ring, wherein any hydrogen in the benzene ring can be substituted with fluorine or chlorine;
- $Z^1$ to $Z^4$ are each independently a single bond or —C≡C—; and
- $n^1$ is 1, and $n^2$ and $n^3$ are 0.

[13] The liquid crystal material according to any one of items [4]-[12], wherein the component 2 includes a compound represented by the following general formula (2):

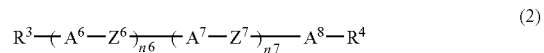

wherein:
- $R^3$ is hydrogen or alkyl having 1 to 20 carbon atoms, wherein any —$CH_2$— in the alkyl can be substituted with —O—, —S—, —COO—, —OCO—, —CH=CH—, —CF=CF— or —C≡C—, and any hydrogen in the alkyl and an alkyl in which any —$CH_2$— is substituted with —O—, —S—, —COO—, —OCO—, —CH=CH—, —CF=CF— or —C≡C— can be substituted with halogen;
- $R^4$ is halogen, —CN, —N=C=O, —N=C=S, —$CF_3$, —$OCF_3$, —C≡C—CN, —C≡C—$CF_3$ or —C≡C—$CF_3$;
- $A^6$, $A^7$ and $A^8$ are each independently an aromatic or nonaromatic 3- to 8-membered ring or a condensed ring having 9 or more carbon atoms, wherein any hydrogen in these rings can be substituted with halogen, alkyl having 1 to 3 carbon atoms or alkyl halide; any —$CH_2$— in the rings can be substituted with —O—, —S—, or —NH—; and —CH= can be substituted with —N=;
- $Z^6$ and $Z^7$ are a single bond or alkylene having 1 to 8 carbon atoms, wherein any —$CH_2$— in the alkylene can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene and an alkylene in which any —$CH_2$— is substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C— can be substituted with halogen; and
- $n^6$ and $n^7$ are 0 or 1, wherein both $n^6$ and $n^7$ are 1 only when at least one of $Z^6$ and $Z^7$ is —$CF_2O$—, and $n^6$ and $n^7$ are 0 when $A^7$ or $A^8$ is a condensed ring having 9 or more carbon atoms.

[14] The liquid crystal material according to item [13], wherein:
- $R^3$ is alkyl having 1 to 10 carbon atoms, wherein any —$CH_2$— in the alkyl can be substituted with —O—, —S—, —COO—, —OCO—, —CH=CH— or —C≡C—;
- $R^4$ is halogen, —CN, —N=C=S, —$CF_3$, —C≡C—CN or —C≡C—$CF_3$;
- $A^6$, $A^7$ and $A^8$ are each independently a benzene ring, a naphthalene ring or a cyclohexane ring, wherein any hydrogen in these rings can be substituted with halogen; any —$CH_2$— in the rings can be substituted with —O— or —S—; and —CH= can be substituted with —N=; and
- $Z^6$ and $Z^7$ are a single bond or alkylene having 1 to 4 carbon atoms, wherein any —$CH_2$— in the alkylene can be substituted with —O—, —S—, —COO—, —OCO—, —CSO—, —OCS—, —CH=CH—, —CF=CF— or —C≡C—; and any hydrogen in the alkylene and an alkylene in which any —$CH_2$— is substituted with —O—, —S—, —COO—, —OCO—, —CSO—, —OCS—, —CH=CH—, —CF=CF— or —C≡C— can be substituted with halogen.

[15] The liquid crystal material according to item [13], wherein:

$R^3$ is alkyl having 1 to 10 carbon atoms, wherein any —$CH_2$— nonadjacent to the aromatic ring in the alkyl can be substituted with —CH=CH—;

$R^4$ is halogen, —CN, —N=C=S, —$CF_3$, —$OCF_3$, —C≡C—CN, —CH=CH—$CF_3$ or —C≡C—$CF_3$;

$A^6$, $A^7$ and $A^8$ are each independently a benzene ring, a naphthalene ring or a cyclohexane ring, wherein any hydrogen in these rings can be substituted with fluorine or chlorine; any —$CH_2$— in these rings can be substituted with —O—; and —CH= can be substituted with —N=; and $Z^6$ and $Z^7$ are each independently a single bond, —COO—, —$CF_2$O— or —C≡C—.

[16] The liquid crystal material according to item [13], wherein:

$R^3$ is alkyl having 1 to 10 carbon atoms, wherein any —$CH_2$— nonadjacent to the aromatic ring in the alkyl can be substituted with —CH=CH—;

$R^4$ is halogen or —CN;

$A^7$ and $A^8$ are each independently a benzene ring, a dioxane ring or a cyclohexane ring, wherein any hydrogen in the benzene ring can be substituted with fluorine;

$Z^7$ is a single bond or —COO—; and $n^6$ is 0 and $n^7$ is 0 or 1.

[17] The liquid crystal material according to any one of items [4]-[12], wherein the component 2 consists of a compound represented by the following general formula (3):

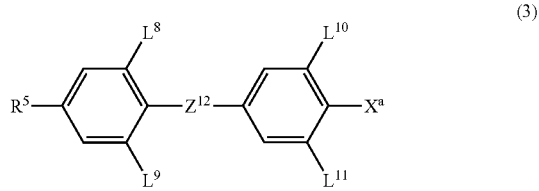

(3)

wherein:

$R^5$ is alkyl having 1 to 10 carbon atoms, wherein any —$CH_2$— in the alkyl can be substituted with —O—, —S—, —COO—, —OCO—, —CH=CH—, —CF=CF— or —C≡C—; and any hydrogen in the alkyl can be substituted with halogen;

$X^a$ is fluorine, chlorine, —CN, —N=C=S, —$CF_3$, —$OCF_3$, —C≡C—CN, —CH=CH—$CF_3$ or —C≡C—$CF_3$;

$Z^{12}$ is a single bond, —COO—, —$CF_2$O— or —C≡C—; and $L^8$ to $L^{11}$ are each independently hydrogen or fluorine.

[18] The liquid crystal material according to item [17], wherein:

$R^5$ is alkyl having 1 to 10 carbon atoms, wherein any —$CH_2$— nonadjacent to the aromatic ring in the alkyl can be substituted with —CH=CH—;

$X^a$ is fluorine or —CN;

$Z^{12}$ is —COO—; and $L^8$ to $L^{11}$ are each independently hydrogen or fluorine, wherein at least two of them are fluorine.

[19] The liquid crystal material according to any one of items [4]-[12], wherein the component 2 consists of a compound represented by the following general formula (4):

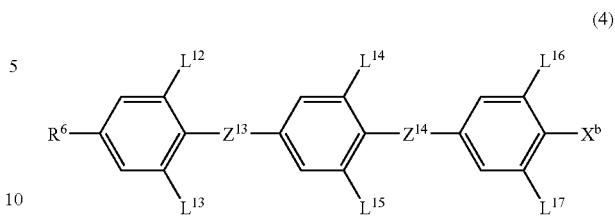

(4)

wherein:

$R^6$ is alkyl having 1 to 10 carbon atoms, wherein any —$CH_2$— in the alkyl can be substituted with —O—, —S—, —COO—, —OCO—, —CH=CH—, —CF=CF— or —C≡C—; and any hydrogen in the alkyl can be substituted with halogen;

$X^b$ is fluorine, chlorine, —$CF_3$, —$OCF_3$, —C≡C—$CF_3$ or —C≡C—$CF_3$;

$Z^{13}$ and $Z^{14}$ are each independently a single bond or —$CF_2$O—, wherein at least one of them is —$CF_2$O—; and $L^{12}$ to $L^{17}$ are each independently hydrogen, fluorine or chlorine.

[20] The liquid crystal material according to item [19], wherein:

$R^6$ is alkyl having 1 to 10 carbon atoms, wherein any —$CH_2$— nonadjacent to the aromatic ring in the alkyl can be substituted with —CH=CH—;

$X^b$ is fluorine, chlorine, —$CF_3$, —$OCF_3$ or —C≡C—$CF_3$;

$Z^{13}$ is a single bond and $Z^{14}$ is —$CF_2$O—; and $L^{12}$ to $L^{17}$ are each independently hydrogen or fluorine, wherein at least two of them are fluorine.

[21] The liquid crystal material according to any one of items [2]-[20], wherein the chiral dopants included in the liquid crystal material include one or more compounds represented by any one of the following formulae (K1) to (K5):

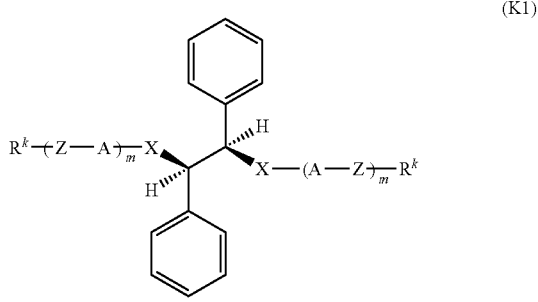

(K1)

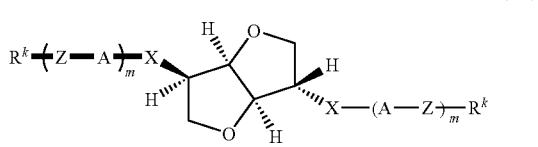

(K2)

-continued

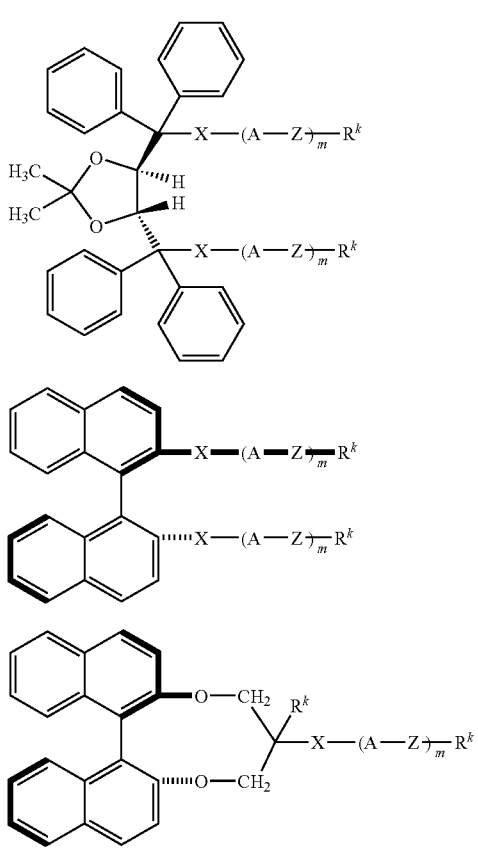

(K3)

(K4)

(K5)

wherein:

each $R^K$ is independently hydrogen, halogen, —CN, —N═C═O, —N═C═S or alkyl having 1 to 20 carbon atoms, wherein any —CH$_2$— in the alkyl can be substituted with —O—, —S—, —COO—, —OCO—, —CH═CH—, —CF═CF— or —C≡C—; and any hydrogen in the alkyl can be substituted with halogen;

each A is independently an aromatic or nonaromatic 3- to 8-membered ring or a condensed ring having 9 or more carbon atoms, wherein any hydrogen in these rings can be substituted with halogen, alkyl having 1 to 3 carbon atoms or haloalkyl; —CH$_2$— in the rings can be substituted with —O—, —S— or —NH—; and —CH═ can be substituted with —N═;

each Z is independently a single bond or alkylene having 1 to 8 carbon atoms, wherein any —CH$_2$— can be substituted with —O—, —S—, —COO—, —OCO—, —CSO—, —OCS—, —N═N—, —CH═N—, —N═CH—, —N(O)═N—, —N═N(O)—, —CH═CH—, —CF═CF— or —C≡C—; and any hydrogen can be substituted with halogen;

X is a single bond, —COO—, —OCO—, —CH$_2$O—, —OCH$_2$—, —CF$_2$O—, —OCF$_2$— or —CH$_2$CH$_2$—; and m is 1 to 4.

[22] The liquid crystal material according to any one of items [2]-[20], wherein the chiral dopants included in the liquid crystal material includes one or more compounds represented by any one of the following formulae (K2-1) to (K2-8) and (K5-1) to (K5-3):

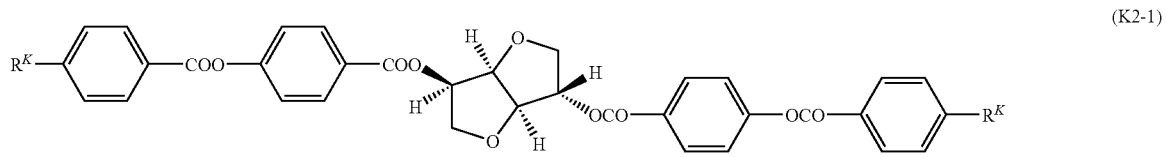

(K2-1)

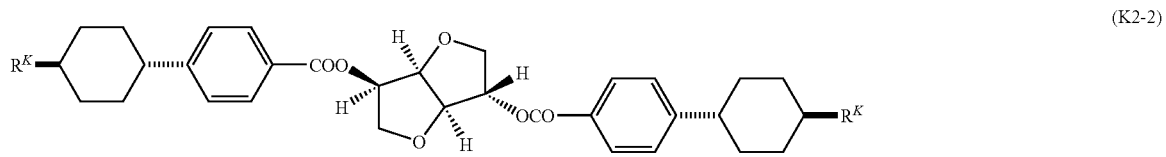

(K2-2)

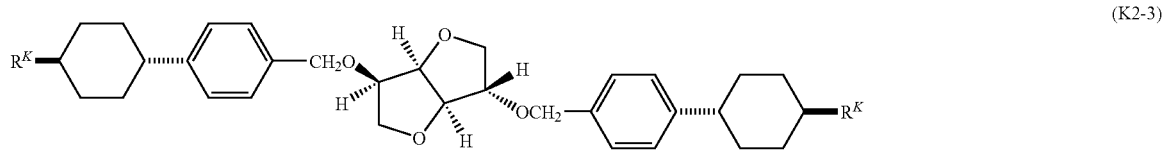

(K2-3)

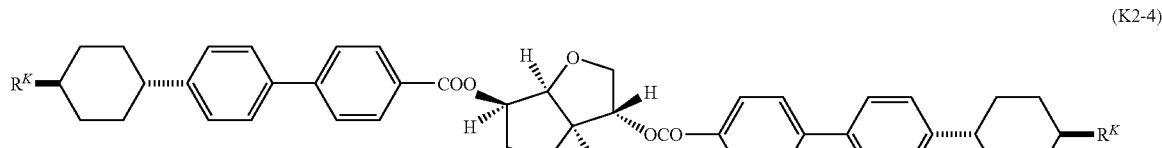

(K2-4)

-continued

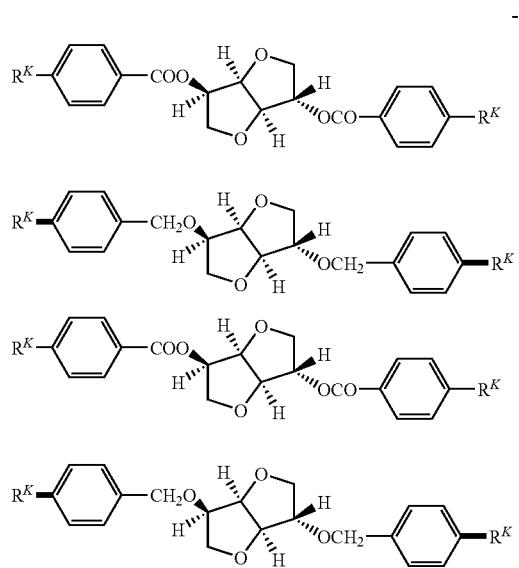
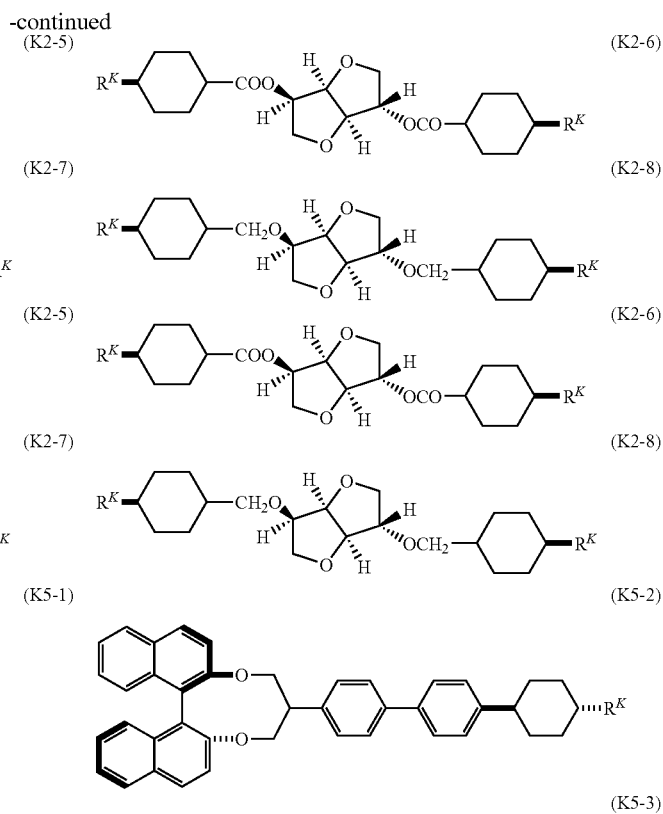
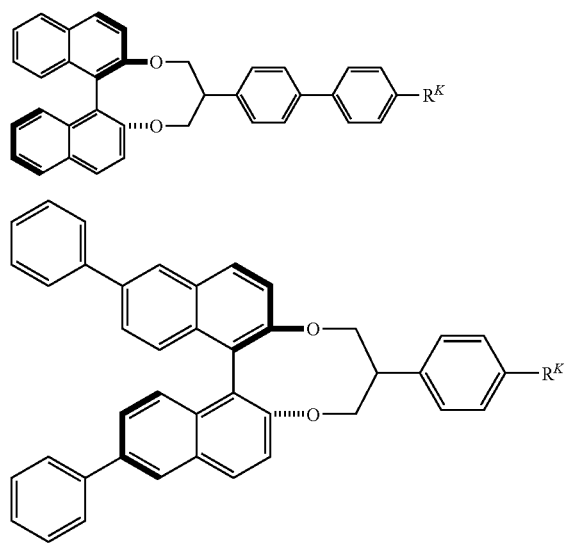
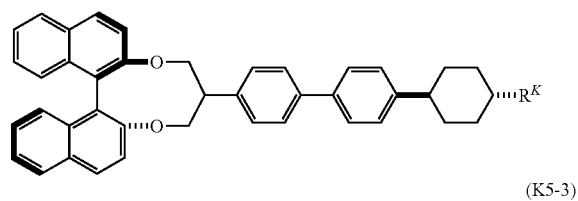

wherein:

each $R^K$ is independently alkyl having 3 to 10 carbon atoms, wherein —$CH_2$— adjacent to the ring in the alkyl can be substituted with —O—; and any —$CH_2$— can be substituted with —CH=CH—.

[23] The liquid crystal material according to any one of items [2]-[22], wherein the chiral dopants are included in an amount of approximately 1 to approximately 40 wt % per the weight of the liquid crystal composition B.

[24] A mixture including the liquid crystal material according to any one of items [1]-[23] and a polymerizable monomer.

[25] The mixture according to item [24], wherein the polymerizable monomer is a photopolymerizable monomer or a thermopolymerizable monomer.

[26] A polymer/liquid crystal composite for use in an element driven in a state of an optically isotropic liquid crystal phase, which can be obtained by polymerizing the mixture according to item [24] or [25].

[27] The polymer/liquid crystal composite according to item [26], wherein the mixture is obtained by polymerization in a state of an optically isotropic liquid crystal phase or an isotropic phase.

[28] The polymer/liquid crystal composite according to item [27], wherein a polymer included in the polymer/liquid crystal composite has a mesogenic moiety.

[29] The polymer/liquid crystal composite according to any one of items [26]-[28], wherein the polymer included in the polymer/liquid crystal composite has a cross-linked structure.

[30] The polymer/liquid crystal composite according to any one of items [26]-[29], including the liquid crystal material in an amount of approximately 60 to approximately 99 wt % and the polymer in an amount of approximately 1 to approximately 40 wt %.

[31] The polymer/liquid crystal composite according to any one of items [26]-[30], wherein the pitch is approximately 700 nm or lower.

[32] A liquid crystal element, in which an electrode is placed on one or both surfaces thereof, and which has a polymer/liquid crystal composite placed between substrates and an electric field applying means for applying electric field on the polymer/liquid crystal composite via the electrode, wherein the polymer/liquid crystal composite is that according to any one of items [26]-[31].

[33] A liquid crystal element, in which an electrode is placed on one or both surfaces thereof, and which has a pair of substrates, at least one of which is transparent; a polymer/liquid crystal composite placed between the substrates; and polarization plates placed on the external sides of the substrates, and which has an electric field applying means for applying electric field on the polymer/liquid crystal composite via the electrode, wherein the polymer/liquid crystal composite is the polymer/liquid crystal composite according to any one of items [26]-[31].

[34] The liquid crystal element according to item [32] or [33], wherein the electrode is constituted on at least one of the pair of substrates so that electric field can be applied in at least two directions.

[35] The liquid crystal element according to item [32] or [33], wherein the electrode is constituted on one or both of the pair of substrates placed in parallel with each other so that electric field can be applied in at least two directions.

[36] The liquid crystal element according to any one of items [32]-[35], wherein the electrode is placed in a matrix state to constitute a pixel electrode; each pixel has an active element; and the active element is a thin film transistor (TFT).

The "polymer/liquid crystal composite" in the invention is not particularly limited as long as it is a composite material comprising both a liquid crystal material and a polymer compound, but a polymer may be phase-separated from the liquid crystal material in a state where a part or all of the polymer is not dissolved in the liquid crystal material. The term "nematic phase" as used herein means a narrowly-defined nematic phase in which no chiral nematic phase is included, unless otherwise specified.

In the polymer/liquid crystal composite related to the preferred embodiment of the present invention, an optically isotropic liquid crystal phase can be exhibited in a wide temperature range. Further, in the polymer/liquid crystal composite related to the preferred embodiment of the present invention, remaining birefringence after electric field elimination can be reduced. The response speed of the polymer/liquid crystal composite related to the preferred embodiment of the present invention is very fast. The polymer/liquid crystal composite related to the preferred embodiment of the present invention can be suitably used for a liquid crystal elements and the like such as indicating element based on these effects.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
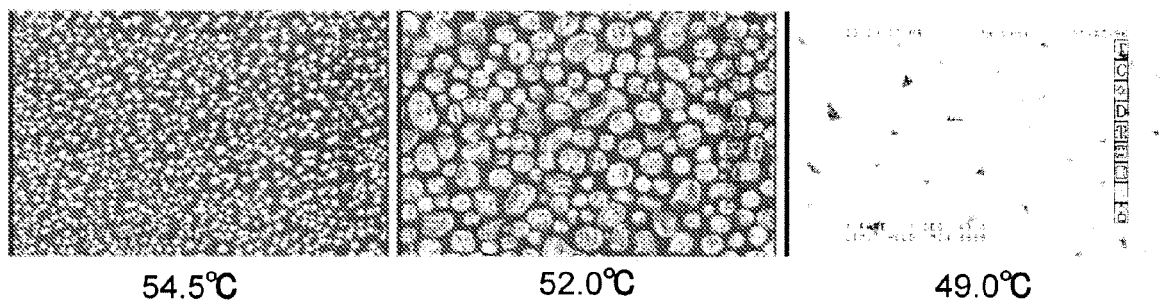
FIG. 1 shows polarization microscope images of liquid crystal composition A-2 in the lowered temperature process.

The liquid crystal material of the invention is a liquid crystal material used for a polymer/liquid crystal composite comprising the liquid crystal material and a polymer for use in an element driven in a state of an optically isotropic liquid crystal phase, wherein the liquid crystal material exhibits the optically isotropic liquid crystal phase in the temperature range of approximately 4.8° C. or more in the elevated temperature process but does not exhibit a nematic phase.

A liquid crystal compound/composition, which exhibits a nematic phase (except a chiral nematic phase), does not exhibit an optically isotropic liquid crystal phase at any temperature. Therefore, the composite material of the invention and the liquid crystal material contained in the composite material do not exhibit the nematic phase at any temperature.

Further, a nematic phase and a chiral nematic phase are not an optically isotropic liquid crystal phase. Therefore, the composite material of the present invention used in an element driven in the state of the optically isotropic liquid crystal phase cannot be used in an element driven in the state of the nematic phase or chiral nematic phase.

The polymer/liquid crystal composite of the invention is an optically isotropic polymer/liquid crystal composite used in an element driven in a state of an optically isotropic liquid crystal phase. That is, the polymer/liquid crystal composite of the invention is a composite material which can be used in a liquid crystal element in a liquid crystalline state (such as a blue phase) showing optically isotropic properties.

1. Liquid Crystal Material

The liquid crystal material contained in the composite material of the invention is not particularly limited, but exhibits the optically isotropic liquid crystal phase in the temperature range of approximately 4.8° C. or more in the elevated temperature process and does not exhibit the nematic phase.

Positive/negative of the dielectric anisotropy of liquid crystal composition a (a composition obtained by excluding all chiral dopants from liquid crystal composition A) contained in the composite material of the invention is not particularly limited, but the dielectric anisotropy of liquid crystal composition a is preferably positive. With respect to the absolute value of the value of dielectric anisotropy of the liquid crystal material ($\Delta\varepsilon$) and the value of optical anisotropy anisotropy ($\Delta n$), the higher these values, the higher the electric birefringence, and therefore these values are preferably as high as possible.

The polymer/liquid crystal composite of the invention preferably shows the Kerr constant of $1\times10^{-11}$ mV$^{-2}$ or higher in order to achieve a low drive voltage, and more preferably shows the Kerr constant of $1\times10^{-8}$ mV$^{-2}$ or higher.

Preferably in the composite material of the invention, there is a region where the ratio of values of the Kerr constant in the temperature difference of approximately 10° C. is 1.5 or lower, that is, the electric birefringence ratio preferably has low dependency on temperature and is stable in a wide temperature range.

The absolute value of the product of optical anisotropy anisotropy ($\Delta n$) and dielectric anisotropy ($\Delta\varepsilon$) in the liquid crystal composition a contained in the composite material of the invention is preferably approximately 0.5 to approximately 60, more preferably approximately 2 to approximately 60, and even more preferably approximately 5 to approximately 60 particularly when using in an indicating element. The aforementioned product can be increased by increasing $\Delta n$, or $\Delta\varepsilon$, or both of them. In general, by increasing the product, $\Delta n_E$ is increased and the drive voltage is decreased.

Moreover, since the pitch has a close relationship with the coherence length, the pitch is preferably optimized depending on purposes in view of the ratio of mixed polymer, the ratio of added chiral dopants, HTP of chiral dopants and the like. The coherence length is preferably approximately 10 to approximately 800 nm. Since the Kerr constant is proportional to the square of the coherence length, the coherence length is preferably as long as possible within a range in which the optically isotropic liquid crystal phase can be obtained.

In the liquid crystal material contained in the composite material of the invention, a liquid crystal compound having no optical activity can be used together with chiral dopants. The viscosity of the liquid crystal compound is correlated to response time of refractive-index change. When high-speed response is required, a liquid crystal compound having low viscosity is preferred. Therefore, the viscosity of the liquid crystal compound having no optical activity to be used with the chiral dopants are preferably approximately 1000 mPa·s or lower, more preferably approximately 400 mPa·s or lower, and particularly preferably approximately 200 mPa·s or lower.

In general, when the weight ratio between the chiral dopants and the liquid crystal compound having no optical activity, which constitute the liquid crystal material of the invention, is within the range from approximately 1:99 to approximately 40:60, a composite material, which has an enough viscosity to function in a liquid crystal element, and which exhibits an optically isotropic liquid crystal phase, can be provided.

Examples of liquid crystal compounds to be used in the polymer/liquid crystal composite of the invention include a compound represented by formula (1), a compound represented by formula (2), a compound represented by formula (3) and a compound represented by formula (4).

Further, examples of liquid crystal materials to be used in the polymer/liquid crystal composite of the invention include liquid crystal composition B exhibiting an optically isotropic liquid crystal phase, which can be obtained by adding a predetermined amount of chiral dopants to liquid crystal composition A, which is obtained by mixing the compound represented by formula (1) with the compound represented by formula (2), (3), (4) etc. The liquid crystal composition A may include chiral dopants within a range where the optically isotropic liquid crystal phase is not exhibited.

In the liquid crystal composition A of the invention, the component 1 preferably consists of one compound represented by formula (1) or a plurality of compounds represented by formula (1), but such compounds are not limited to those represented by formula (1) as long as they have a high clearing point. Similarly, the component 2 preferably consists of one compound represented by formula (2), (3) or (4) or a plurality of compounds represented by formula (2), (3) or (4), but such compounds are not limited to those represented by formula (2), (3) or (4) as long as they have a low clearing point.

The "liquid crystal composition" as used herein refers to a composition having a liquid crystal phase or a composition in which a material having a liquid crystal phase is mixed, wherein the liquid crystal phase-non-liquid crystalline isotropic phase transition temperature is not significantly reduced.

When the liquid crystal compound or the liquid crystal composition does not exhibit the liquid crystal phase, a method for calculating a liquid crystal phase-non-liquid crystalline isotropic phase transition point using an extrapolation method is employed as described below. This extrapolation method can be applied to a compound or a composition whose liquid crystal phase-non-liquid crystalline isotropic phase transition point is higher than the decomposition temperature of liquid crystal.

1.1 Liquid Crystal Composition A

The liquid crystal composition A is a composition, wherein the difference between the upper limit and the lower limit of a temperature allowing coexistence of the nematic phase and the non-liquid crystalline isotropic phase or the difference between the upper limit and the lower limit of a temperature allowing coexistence of the chiral nematic phase and the non-liquid crystalline isotropic phase is approximately 3.0° C. or more, and wherein the optically isotropic liquid crystal phase is not exhibited in the elevated temperature process.

The liquid crystal composition A is not particularly limited as long as it has the above-described characteristics, and the chiral dopants may or may not be contained therein.

1.1.1. Clearing Point

In the liquid crystal composition A of the invention, the clearing points ($T_1$) and ($T_2$) of the components 1 and 2 contained in the liquid crystal composition A and the clearing point (T×B) of the liquid crystal composition B as described later preferably satisfy the following formulae:

$T_1 > T_2$ $T_1 - T \times B \geqq 100°$ C.

More preferably, these clearing points satisfy the following formulae:

$T_1 > T_2$ $T_1 - T \times B \geqq 150°$ C.

Particularly preferably, these clearing points satisfy the following formulae:

$T_1 > T_2$ $T_1 - T \times B \geqq 200°$ C.

When each of the component 1 and the component 2 includes a plurality of compounds, the clearing points of the component 1 and the component 2 are clearing points of compositions, each of which is obtained based on the weight ratio of compounds constituting the component 1 or the component 2.

The liquid crystal composition A having the clearing point T×A can be prepared by selecting the component 1, which includes a compound (compounds) having a high clearing point, and the component 2, which includes a compound (compounds) having a low clearing point, and according to circumstances, by adding a component which does not correspond to the component 1 or 2 (third component) and chiral dopants in view of other property parameters such as Δn and Δ∈.

For example, when the liquid crystal composition A includes 5 compounds A1 to A5, and they are listed as compounds A1, A2, A3, A4 and A5 in descending order of clearing point, at least the compound A1 having the highest clearing point corresponds to the component 1, and the compound A5 having the lowest clearing point corresponds to the compound contained in the component 2. Moreover, the compound A2 having the second highest clearing point may be optionally contained in the component 1, and the compound A4 having the second lowest clearing point may be contained in the component 2. Furthermore, since there may be a compound which does not correspond to the component 1 or 2, for example, when the compound A1 and the compound A2 correspond to the compounds contained in the component 1, and the compound A4 and the compound A5 correspond to the compounds contained in the component 2, the compound A3 is the third component which does not correspond to the component 1 or 2.

That is, whether or not each compound contained in the liquid crystal composition A corresponds to the component 1 or 2 is not particularly limited. It is preferable that, when compounds contained in the liquid crystal composition A are divided between the component 1 having a relatively high clearing point and the component 2 having a relatively low clearing point, the clearing points of the components 1 and 2 and the liquid crystal composition satisfy the above-described formulae.

When the liquid crystal composition A comprises chiral dopants, the liquid crystal composition can be divided into a liquid crystal composition a, which does not include the chiral dopants, and the chiral dopants. In general, the clearing point of the liquid crystal composition a (T×a) is higher than the clearing point of the liquid crystal composition A (T×A), and the clearing point of the liquid crystal composition A (T×A) is higher than the clearing point of the liquid crystal composition B (T×B). In this case, preferably $T_1$, $T_2$ and T×a satisfy the following formulae:

$$T_1 > T_2$$

$$T_1 - T \times a \geqq 100°\ C.$$

More preferably, these clearing points satisfy the following formulae:

$$T_1 > T_2$$

$$T_1 - T \times a \geqq 150°\ C.$$

Particularly preferably, these clearing points satisfy the following formulae:

$$T_1 > T_2$$

$$T_1 - T \times a \geqq 200°\ C.$$

The method for calculating the clearing point is as follows. When the composition ratio (by weight) of compound A1: compound A2: compound A3: compound A4: compound A5 is C1:C2:C3:C4:C5, and the component 1 includes the compound A1 and the compound A2 and the component 2 includes the compound A4 and the compound A5, $T_1$ is a clearing point in a mixture in which the compound A1 and the compound A2 are mixed in the ratio (by weight) of C1:C2 and $T_2$ is a clearing point in a mixture in which the compound A4 and the compound A5 are mixed in the ratio (by weight) of C4:C5.

The clearing point means a point at which a compound or composition exhibits a non-liquid crystalline isotropic phase in the elevated temperature process. Specific examples of clearing points include N-I point, which is a phase transition point from a nematic phase to a non-liquid crystalline isotropic phase. In the case of the liquid crystal composition of the invention, a coexisting state of a non-liquid crystalline isotropic phase and a liquid crystal phase may be exhibited. In this case, a temperature at which a non-liquid crystalline isotropic phase is initially appeared in the elevated temperature process is defined as a clearing point. Further, a clearing point of a compound which does not exhibit a liquid crystal phase, i.e., a compound having K-I point, is K-I point or lower. According to need, the method for calculating a liquid crystal phase-non-liquid crystalline isotropic phase transition point using the extrapolation method as described below can be employed.

1.1.2. Component 1

The component 1 preferably includes a compound having a relatively high clearing point. Specifically, the component 1 preferably includes a compound represented by formula (1). In formula (1): $R^1$ is hydrogen or alkyl having 1 to 20 carbon atoms; any —$CH_2$— in the alkyl can be substituted with —O—, —S—, —COO—, —OCO—, —CH═CH—, —CF═CF— or —C≡C—; and any hydrogen in the alkyl group can be substituted with halogen. Among them, $R^1$ is preferably alkyl having 1 to 10 carbon atoms, and any —$CH_2$— in the alkyl can be substituted with —O—, —S—, —COO—, —OCO—, —CH═CH— or —C≡C—. More preferably, $R^1$ is alkyl having 1 to 10 carbon atoms, and any —$CH_2$— in the alkyl can be substituted with —CH═CH— or —C≡C—. Among them, $R^1$ is most preferably alkyl having 1 to 10 carbon atoms or alkoxy.

In formula (1): $R^2$ is hydrogen, halogen, —CN, —N═C═O, —N═C═S, —$CF_3$, —$OCF_3$ or alkyl having 1 to 20 carbon atoms; any —$CH_2$— in the alkyl can be substituted with —O—, —S—, —COO—, —OCO—, —CH═CH—, —CF═CF— or —C≡C—; any hydrogen in the alkyl can be substituted with halogen; and —$CH_3$ in the alkyl can be substituted with —CN. Among them, $R^2$ is preferably halogen, —CN, —N═C═O, —N═C═S, —$CF_3$, —$OCF_3$ or alkyl having 1 to 20 carbon atoms; any —$CH_2$— in the alkyl can be substituted with —O—, —CH═CH— or —C≡C—; any hydrogen in the alkyl can be substituted with halogen; and —$CH_3$ in the alkyl can be substituted with —CN. $R^2$ is more preferably fluorine, chlorine, —CN, —N═C═S or alkyl having 1 to 20 carbon atoms, and any —$CH_2$— in the alkyl can be substituted with —O—, —CH═CH— or —C≡C—.

In formula (1), $A^1$ to $A^5$ are each independently an aromatic or nonaromatic 3- to 8-membered ring or a condensed ring having 9 or more carbon atoms, wherein any hydrogen in these rings can be substituted with halogen, alkyl having 1 to 3 carbon atoms or alkyl halide; —$CH_2$— in the rings can be substituted with —O—, —S— or —NH—; —CH═ can be substituted with —N═; and $A^1$ to $A^5$ are not tetrahydropyran rings. Among them, preferably, $A^1$ to $A^5$ are each independently a benzene ring, a naphthalene ring, a dioxane ring or a cyclohexane ring, wherein any hydrogen in these rings can be substituted with halogen, alkyl having 1 to 3 carbon atoms or alkyl halide, and —$CH_2$— in the rings can be substituted with —O— or —S—, and —CH═ can be substituted with —N═. More preferably, $A^1$ to $A^5$ are each independently a benzene ring, a naphthalene ring, a dioxane ring or a cyclohexane ring, wherein any hydrogen in the benzene ring or the naphthalene ring can be substituted with fluorine, chlorine, methyl or methyl halide; —$CH_2$— can be substituted with —O— or —S—; and —CH═ can be substituted with —N═. Among them, most preferably, $A^1$ to $A^5$ are each independently a benzene ring, a pyrimidine ring, a dioxane ring or a cyclohexane ring, wherein any hydrogen in the benzene ring can be substituted with fluorine.

In formula (1), $Z^1$ to $Z^4$ are each independently a single bond or alkylene having 1 to 8 carbon atoms, wherein any —$CH_2$— in the alkylene can be substituted with —O—, —S—, —COO—, —OCO—, —CSO—, —OCS—, —N═N—, —CH═N—, —N═CH—, —N(O)═N—, —N═N(O)—, —CH═CH—, —CF═CF— or —C≡C—, and any hydrogen can be substituted with halogen. Among them, preferably, $Z^1$ to $Z^4$ are each independently a single bond or alkylene having 1 to 4 carbon atoms, wherein any —$CH_2$— in the alkylene can be substituted with —O—, —S—, —COO—, —OCO—, —CSO—, —OCS—, —CH═CH—, —CF═CF— or —C≡C—, and any hydrogen can be substituted with halogen. More preferably, $Z^1$ to $Z^4$ are each independently a single bond, —COO—, —CF$_2$O— or —C≡C—.

In formula (1), $n^1$ to $n^3$ are each independently 0 or 1, wherein: $n^2$ and $n^3$ are 1 when $R^2$ is hydrogen or fluorine; $n^2$ and $n^3$ are 1 when at least one of $Z^1$ to $Z^4$ is —CF$_2$O—; $n^2$ and $n^3$ are 1 when $Z^4$ is —COO—; and all of $n^1$ to $n^3$ may be 0 only when at least one of $A^4$ and $A^5$ is a condensed ring having 9 or more carbon atoms. Among them, preferably, $n^1$ to $n^3$ are each independently 0 or 1, wherein $n^2$ and $n^3$ are 1 when $R^2$ is hydrogen or fluorine, and all of $n^1$ to $n^3$ may be 0 only when at least one of $A^4$ and $A^5$ is a condensed ring having 9 or more carbon atoms. Among them, more preferably, $n^1$ to $n^3$ are each independently 0 or 1, wherein $n^2$ and $n^3$ are 1 when $R^2$ is hydrogen or fluorine, and all of $n^1$ to $n^3$ may be 0 only when at least one of $A^4$ and $A^5$ is a condensed ring having 9 or more carbon atoms.

The compound represented by formula (1) preferably has a clearing point of approximately 150° C. to approximately 400° C., and more preferably has a clearing point of approximately 200° C. to approximately 350° C. When the clearing point is lower than approximately 150° C., it is disadvantageous in terms of satisfying the relation between the clearing point of the component 1 ($T_1$) and the clearing point of the liquid crystal composition B (T×B) ($T_1$−T×B≧100° C.). When the clearing point is higher than approximately 400° C., the compatibility may be decreased depending on other compounds to be combined therewith, and the lower limit of temperature of the liquid crystal phase may be raised, wherein crystal is separated out at a low temperature.

1.1.3. Component 2

The component 2 is preferably a compound having a low clearing point and a large value of dielectric anisotropy. Specifically, the component 2 preferably consists of a compound represented by formula (2), (3) or (4).

1.1.3.1 Compound Represented by Formula (2)

In formula (2), $R^3$ is hydrogen or alkyl having 1 to 20 carbon atoms, wherein any —CH$_2$— in the alkyl can be substituted with —O—, —S—, —COO—, —OCO—, —CH=CH—, —CF=CF— or —C≡C—, and any hydrogen in the alkyl can be substituted with halogen. Among them, preferably, $R^3$ is alkyl having 1 to 10 carbon atoms, wherein any —CH$_2$— in the alkyl can be substituted with —O—, —S—, —COO—, —OCO—, —CH=CH— or —C≡C—. More preferably, $R^3$ is alkyl having 1 to 10 carbon atoms, wherein any —CH$_2$— in the alkyl can be substituted with —O—, —CH=CH— or —C≡C—. Most preferably, $R^3$ is alkyl having 1 to 10 carbon atoms, wherein any —CH$_2$— in the alkyl can be substituted with —O—.

In formula (2), $R^4$ is halogen, —CN, —N=C=O, —N=C=S, —CF$_3$—, —OCF$_3$—, —C≡C—CN or —C≡C—CF$_3$. Among them, $R^4$ is preferably halogen, —CN, —N=C=S, —CF$_3$, —C≡C—CN or —C≡C—CF$_3$.

In formula (2), $A^6$, $A^7$ and $A^8$ are each independently an aromatic or nonaromatic 3- to 8-membered ring or a condensed ring having 9 or more carbon atoms, wherein any hydrogen in these rings can be substituted with halogen, alkyl having 1 to 3 carbon atoms or alkyl halide; any —CH$_2$— in the rings can be substituted with —O—, —S— or —NH—; and —CH= can be substituted with —N=.

Among them, more preferably, $A^6$, $A^7$ and $A^8$ are each independently a benzene ring, a naphthalene ring or a cyclohexane ring, wherein any hydrogen in these rings can be substituted with halogen, alkyl having 1 to 3 carbon atoms or alkyl halide; any —CH$_2$— in the rings can be substituted with —O— or —S—; and —CH= can be substituted with —N=.

Even more preferably, $A^6$, $A^7$ and $A^8$ are each independently a benzene ring, a naphthalene ring or a cyclohexane ring, wherein any hydrogen in these rings can be substituted with fluorine, chlorine, methyl or methyl halide; any —CH$_2$— in the rings can be substituted with —O— or —S—; and —CH= can be substituted with —N=. Most preferably, $A^6$, $A^7$ and $A^8$ are each independently a benzene ring, a pyrimidine ring, a dioxane ring or a cyclohexane ring, wherein any hydrogen in the benzene ring can be substituted with fluorine.

In formula (2), $Z^6$ and $Z^7$ are each independently a single bond or alkylene having 1 to 8 carbon atoms, wherein any —CH$_2$— in the alkylene can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene can be substituted with halogen. Among them, $Z^6$ and $Z^7$ are preferably a single bond or alkylene having 1 to 4 carbon atoms, wherein any —CH$_2$— in the alkylene can be substituted with —O—, —S—, —COO—, —OCO—, —CSO—, —OCS—, —CH=CH—, —CF=CF— or —C≡C—, and any hydrogen in the alkylene can be substituted with halogen. $Z^6$ and $Z^7$ are more preferably a single bond, —COO—, —CF$_2$O— or —C≡C—. Most preferably, $Z^6$ is a single bond, —CF$_2$O— or —COO—.

In formula (2), $n^6$ and $n^7$ are each independently 0 or 1. Both $n^6$ and $n^7$ are 1 only when at least one of $Z^6$ and $Z^7$ is —CF$_2$O—. Both $n^6$ and $n^7$ are 0 when $A^7$ or $A^8$ is a condensed ring having 9 or more carbon atoms. Among them, preferably, $Z^7$ is —CF$_2$O— and both $n^6$ and $n^7$ are 1; or $Z^7$ is a single bond or —COO—, $n^6$ is 0 and $n^7$ is 1.

1.1.3.2. Compound Represented by Formula (3)

In formula (3), $R^5$ is alkyl having 1 to 10 carbon atoms, wherein any —CH$_2$— in the alkyl can be substituted with —O—, —S—, —COO—, —OCO—, —CH=CH—, —CF=CF— or —C≡C—, and any hydrogen in the alkyl can be substituted with halogen. Among them, $R^5$ is preferably alkyl having 1 to 10 carbon atoms, wherein any —CH$_2$— in the alkyl can be substituted with —O—, —CH=CH— or —C≡C—.

In formula (3), $X^a$ is fluorine, chlorine, —CN, —N=C=S, —CF$_3$, —OCF$_3$, —C≡C—CN or —C≡C—CF$_3$.

In formula (3), $Z^{12}$ is a single bond, —COO— or —C≡C—, and among them, —COO— is preferable.

In formula (3), $L^8$ to $L^{11}$ are each independently hydrogen or fluorine. Among them, preferably, $L^8$ to $L^{11}$ are each independently hydrogen or fluorine, wherein at least two of them are fluorine.

1.1.3.3. Compound Represented by Formula (4)

In formula (4), $R^6$ is alkyl having 1 to 10 carbon atoms, wherein any —CH$_2$— in the alkyl can be substituted with —O—, —S—, —COO—, —OCO—, —CH=CH—, —CF=CF— or —C≡C—, and any hydrogen in the alkyl can be substituted with halogen. Among them, $R^6$ is preferably alkyl having 1 to 10 carbon atoms, wherein any —CH$_2$— in the alkyl can be substituted with —O—, and —CH$_2$— nonadjacent to the aromatic ring can be substituted with —CH=CH—.

In formula (4), $X^b$ is fluorine, chlorine, —CF$_3$, —OCF$_3$, —C≡C—CF$_3$ or —C≡C—CF$_3$. Particularly preferably, $X^b$ is fluorine, chlorine, —CF$_3$ or —OCF$_3$.

In formula (4), $Z^{13}$ and $Z^{14}$ are a single bond or —CF$_2$O—, wherein at least one of them is —CF$_2$O—. More preferably, $Z^{13}$ is a single bond.

In formula (4), $L^{12}$ to $L^{17}$ are each independently hydrogen, chlorine or fluorine. Among them, preferably, $L^{12}$ to $L^{17}$ are each independently hydrogen or fluorine, wherein at least two of them are fluorine.

1.1.4. Weight Ratio

When the clearing point of the component 1 is approximately 150 to approximately 250° C., preferably, the component 1 is contained in an amount of approximately 10 to approximately 80 wt % and the component 2 is contained in an amount of approximately 20 to approximately 90 wt % in the liquid crystal composition A. More preferably, the component 1 is contained in an amount of approximately 30 to approximately 60 wt % and the component 2 is contained in an amount of approximately 30 to approximately 70 wt %. When the clearing point of the component 1 is approximately 250 to approximately 400° C., preferably, the component 1 is contained in an amount of approximately 5 to approximately 70 wt % and the component 2 is contained in an amount of approximately 30 to approximately 95 wt % in the liquid crystal composition A. As described above, a plurality of compounds represented by formula (1) can be contained in the liquid crystal composition of the present invention as the component 1, and similarly, a plurality of compounds represented by formula (2) can be contained as the component 2. Therefore, for example, when a plurality of compounds represented by formula (1) is contained, the total amount of the compounds represented by formula (1) is approximately 10 to approximately 80 wt % (or approximately 5 to approximately 70 wt %).

1.1.5. Temperature Range Allowing Coexistence of the Nematic Phase and the Non-Liquid Crystalline Isotropic Phase or the Chiral Nematic Phase and the Non-Liquid Crystalline Isotropic Phase The liquid crystal composition A is a liquid crystal composition, which exhibits the coexistence state of the nematic phase and the non-liquid crystalline isotropic phase in the lowered temperature process when no chiral dopant is contained, and which exhibits the coexistence state of the chiral nematic phase and the non-liquid crystalline isotropic phase in the lowered temperature process when the chiral dopants are contained. Further, the liquid crystal composition A is a composition which does not exhibit an optically isotropic liquid crystal phase. The coexistence state of the nematic phase and the non-liquid crystalline isotropic phase or the coexistence state of the chiral nematic phase and the non-liquid crystalline isotropic phase can be confirmed, for example, by observation using a polarization microscope. These coexistence states are not caused by temperature gradient with respect to the liquid crystal composition.

The liquid crystal composition A, which is a component in the liquid crystal material of the present invention, preferably has a wide temperature range allowing coexistence of the nematic phase and the non-liquid crystalline isotropic phase or the chiral nematic phase and the non-liquid crystalline isotropic phase. Specifically, the difference between the upper limit and the lower limit of a temperature allowing the coexistence of these phases is more preferably approximately 5 to approximately 150° C. When the temperature range allowing the coexistence of these phases is wide, the liquid crystal composition B (the liquid crystal material of the present invention), which is obtained by further adding the chiral dopants, tends to have an optically isotropic liquid crystal phase in a wide temperature range. In the polymer/liquid crystal composite of the invention using the liquid crystal composition B, birefringence does not easily remain after electric field elimination, and high speed response is realized.

When the chiral dopants are added to the liquid crystal composition A, in which the nematic phase and the non-liquid crystalline isotropic phase coexist in a wide temperature range, and which does not comprise the chiral dopants, the liquid crystal composition A, in which the chiral nematic phase and the non-liquid crystalline isotropic phase coexist in a wide temperature range, can be easily obtained.

The pitch of the chiral nematic phase, which does not coexist with the non-liquid crystalline isotropic phase in the liquid crystal composition A, is generally approximately 700 nm or more. As described later, when the chiral dopants are added, the liquid crystal composition B having a shorter pitch can be obtained.

1.2. Liquid Crystal Composition B

1.2.1. Composition of the Liquid Crystal Composition B

The liquid crystal composition B (liquid crystal material of the invention) is a composition which exhibits an optically isotropic liquid crystal phase. For example, the liquid crystal composition B can be obtained by further adding the chiral dopants to the liquid crystal composition A.

A liquid crystal composition, in which the chiral dopants are added in an amount of approximately 1 to approximately 40 wt %, preferably in an amount of approximately 5 to approximately 15 wt % of the total weight of the liquid crystal composition B, tends to have an optically isotropic liquid crystal phase, and therefore is preferable, though it depends on the composition of the liquid crystal composition A, the type of the chiral dopants to be added and the like.

In the step of producing the liquid crystal composition B, which is characterized by addition of the chiral dopants to the liquid crystal composition A, the chiral dopants which can be contained in the liquid crystal composition A in advance and the chiral dopants which are further added in order to obtain the liquid crystal composition B may be the same or different.

1.2.2 Clearing Point

In the liquid crystal composition B of the invention, the clearing points ($T_1$) and ($T_2$) of the components 1 and 2 contained in the liquid crystal composition A and the clearing point (T×B) of the liquid crystal composition B as described later preferably satisfy the following formulae:

$T_1 > T_2$ $T_1 - T \times B \geqq 100°$ C.

More preferably, these clearing points satisfy the following formulae:

$T_1 > T_2$ $T_1 - T \times B \geqq 150°$ C.

Particularly preferably, these clearing points satisfy the following formulae:

$T_1 > T_2$ $T_1 - T \times B \geqq 200°$ C.

1.2.3. Chiral Dopant

The chiral dopants contained in the liquid crystal composition B (liquid crystal material of the invention) is preferably a compound having a strong helical twisting power. In the case of a compound having a strong helical twisting power, an adding amount thereof required to obtain a desired pitch can be decreased, and therefore increase in drive voltage can be suppressed, and it is practically advantageous. Specifically, compounds represented by the above-described formulae (K1) to (K5) are preferable.

In formulae (K1) to (K5): each $R^K$ is independently hydrogen, halogen, —CN, —N=C=O, —N=C=S or alkyl having 1 to 20 carbon atoms, wherein any —$CH_2$— in the alkyl can be substituted with —O—, —S—, —COO—, —OCO—, —CH=CH—, —CF=CF— or —C≡C—, and any hydrogen in the alkyl can be substituted with halogen; each A is independently an aromatic or nonaromatic 3- to 8-membered ring or a condensed ring having 9 or more carbon atoms, wherein any hydrogen in these rings can be substituted with halogen, alkyl having 1 to 3 carbon atoms or haloalkyl; —$CH_2$— in the rings can be substituted with —O—, —S— or —NH—, and —CH= can be substituted with —N=; each Z is independently a single bond or alkylene having 1 to 8 carbon atoms, wherein any —$CH_2$— can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be substituted with halogen; X is a single bond, —COO—, —OCO—, —$CH_2$O—, —O$CH_2$—, —$CF_2$O—, —OC$F_2$— or —$CH_2CH_2$—; and m is 1 to 4.

Among them, the chiral dopants contained in the liquid crystal composition B is preferably represented by formulae (K2-1) to (K2-8) included in formula (K2) and formulae (K5-1) to (K5-3) included in formula (K5) (in the formulae, each $R^K$ is independently alkyl having 3 to 10 carbon atoms, wherein —$CH_2$— adjacent to the ring in the alkyl can be substituted with —O—, and any —$CH_2$— can be substituted with —CH=CH—).

The chiral dopants are contained preferably in an amount of approximately 1 to approximately 40 wt %, more preferably in an amount of approximately 3 to approximately 25 wt %, and most preferably in an amount of approximately 5 to approximately 15 wt % of the total weight of the liquid crystal composition B.

1.2.4. Optically Isotropic Liquid Crystal Phase

The liquid crystal composition B (liquid crystal material of the invention) has an optically isotropic liquid crystal phase. "A liquid crystal composition exhibits an optically isotropic liquid crystal phase" means that the composition shows optically isotropic nature since liquid crystal molecular alignment is macroscopically isotropic, but liquid crystalline order is microscopically present. The pitch based on the liquid crystalline order, which the liquid crystal composition B microscopically has, is preferably approximately 700 nm or less, more preferably approximately 500 nm or less, and most preferably approximately 350 nm or less.

The term "non-liquid crystalline isotropic phase" means a generally-defined isotropic phase, i.e., a disordered phase, wherein, if the phase is generated by a region whose local order parameter is not zero, the cause thereof is fluctuation. For example, an isotropic phase which is exhibited in the high temperature side of the nematic phase corresponds to the non-liquid crystalline isotropic phase in the present specification. The same definition is applied to the chiral liquid crystal in the present specification. Further, the term "optically isotropic liquid crystal phase" as used herein refers to a phase which exhibits an optically isotropic (not fluctuant) liquid crystal phase. Examples thereof include a phase which exhibits a platelet texture (blue phase in a limited sense).

In general, the blue phase is classified into three types (blue phase I, blue phase II and blue phase III). All of the three types of blue phases are optically active and optically isotropic. In the blue phases I and II, 2 or more types of diffracted lights attributed to Bragg reflections from different lattice planes are observed.

2. Polymer

The composite material of the invention can also be produced by mixing the liquid crystal composition B (liquid crystal material of the invention) with a polymer obtained in advance by means of polymerization. Preferably, the composite material is produced by mixing the liquid crystal composition B with a low-molecular-weight monomer, macromonomer, oligomer or the like (hereinafter collectively referred to as "monomer and the like"), which is converted to a polymer, and thereafter by conducting polymerization reaction in the mixture. In the specification, a mixture including the monomer and the like and the liquid crystal composition B is referred to as "polymerizable monomer/liquid crystal mixture." Depending on the necessity, the "polymerizable monomer/liquid crystal mixture" may contain a polymerization initiator, a curing agent, a catalyst, a stabilization agent, a dichroism pigment, a photochromic compound or the like within a range in which the effects of the invention are not reduced, as described later. For example, depending on the necessity, the polymerizable monomer/liquid crystal mixture of the present invention may contain a polymerization initiator in an amount of approximately 0.1 to approximately 20 parts by weight per 100 parts by weight of the polymerizable monomer.

Polymerization temperature is preferably a temperature at which the polymer/liquid crystal composite shows high transparency and isotropic nature. More preferably, polymerization is started at a temperature at which a mixture of the monomer and the liquid crystal material exhibits the isotropic phase or the blue phase and is terminated in the state of the isotropic phase or the optically isotropic liquid crystal phase. That is, polymerization temperature is preferably a polymerization temperature at which, after polymerization, the polymer/liquid crystal composite does not substantially scatter light which is nearer to the long-wavelength side compared to the visible light and exhibits an optically isotropic state.

For example, a low-molecular-weight monomer, macromonomer and oligomer can be used as a raw material monomer of a polymer constituting the composite material of the invention. In the present specification, the phrase "raw material monomer of a polymer" is intended to include a low-molecular-weight monomer, macromonomer, oligomer and the like. Further, a polymer to be obtained preferably has a three-dimensional cross-linked structure. Therefore, as a raw material monomer of a polymer, a multifunctional monomer having 2 or more polymerizable functional groups is preferably used. The polymerizable functional group is not particularly limited, and examples thereof include an acryl group, a methacryl group, a glycidyl group, an epoxy group, an oxetanyl group, a vinyl group and the like. From the viewpoint of polymerization velocity, an acryl group and a methacryl group are preferred. In a raw material monomer of a polymer, approximately 10 wt % or more of a monomer having 2 or more polymerizable functional groups is preferably contained since the composite material of the invention tends to easily show high transparency and isotropic nature thereby.

Further, in order to obtain a suitable composite material, a polymer preferably has a mesogenic moiety. A raw material monomer having a mesogenic moiety can be used as a part or all of the raw material monomer of the polymer.

2.1. Monofunctional/Bifunctional Monomer Having a Mesogenic Moiety

  (M1)

  (M2)

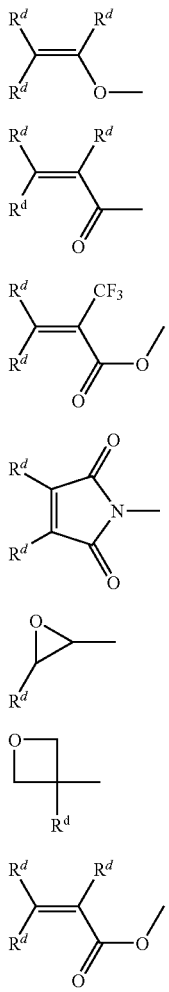

(M3-1)
(M3-2)
(M3-3)
(M3-4)
(M3-5)
(M3-6)
(M3-7)

In formula (M1), $R^a$ is each independently hydrogen, halogen, —CN, —N=C=O, —N=C=S or alkyl having 1 to 20 carbon atoms, wherein any —$CH_2$— in the alkyl can be substituted with —O—, —S—, —CO—, —COO—, —OCO—, —CH=CH—, —CF=CF— or —C≡C—, and any hydrogen in the alkyl can be substituted with halogen or —CN.

$R^a$ is preferably hydrogen, halogen, —CN, —$CF_3$, —$CF_2H$, —$CFH_2$, —$OCF_3$, —$OCF_2H$, alkyl having 1 to 20 carbon atoms, alkoxy having 1 to 19 carbon atoms, alkenyl having 2 to 21 carbon atoms or alkynyl having 2 to 21 carbon atoms. Particularly preferably, $R^a$ is —CN, alkyl having 1 to 20 carbon atoms or alkoxy having 1 to 19 carbon atoms. In formula (M1), $R^b$ is each independently one of polymerizable groups represented by (M3-1) to (M3-7).

In formula (M2), $R^b$ is each independently one of polymerizable groups represented by (M3-1) to (M3-7).

Each $R^d$ in the groups (M3-1) to (M3-7) is independently hydrogen, halogen or alkyl having 1 to 5 carbon atoms, wherein any hydrogen in the alkyl can be substituted with halogen. Preferably, $R^d$ is hydrogen, halogen or methyl. Particularly preferably, $R^d$ is hydrogen, fluorine or methyl.

Polymerization of the groups (M3-2), (M3-3), (M3-4) and (M3-7) is suitably conducted by means of radical polymerization. Polymerization of the groups (M3-1), (M3-5) and (M3-6) is suitably conducted by means of cationic polymerization. Since both the polymerizations are living polymerization, they are initiated when a small amount of radical or cation active species is generated in a reaction system. A polymerization initiator can be used in order to accelerate generation of active species. For example, light or heat can be used for generation of active species.

In formulae (M1) and (M2), $A^M$ is each independently an aromatic or nonaromatic 5- or 6-membered ring or a condensed ring having 9 or more carbon atoms, wherein —$CH_2$— in the rings can be substituted with —O—, —S—, —NH— or —$NCH_3$—; —CH= in the rings can be substituted with —N=; and a hydrogen atom on the rings can be substituted with halogen, alkyl having 1 to 5 carbon atoms or alkyl halide. Favorable examples of $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl and bicyclo[2.2.2]octane-1,4-diyl. In these rings, any —$CH_2$— can be substituted with —O—, and any —CH= can be substituted with —N=. Further, in these rings, any hydrogen can be substituted with halogen, alkyl having 1 to 5 carbon atoms or alkyl halide having 1 to 5 carbon atoms.

In view of the stability of compounds, —$CH_2$—O—$CH_2$—O—, in which oxygen atoms are not adjacent to each other, is more preferable than —$CH_2$—O—O—$CH_2$—, in which oxygen atoms are adjacent to each other. The same applies to the case of sulfur atoms.

Among them, $A^M$ is particularly preferably 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl or pyrimidine-2,5-diyl. The aforementioned 1,4-cyclohexylene and 1,3-dioxane-2,5-diyl more preferably have trans-configuration compared to cis-configuration.

2-fluoro-1,4-phenylene and 3-fluoro-1,4-phenylene are structurally identical, and therefore the latter is not listed herein. This rule is applied to the relationship between 2,5-difluoro-1,4-phenylene and 3,6-difluoro-1,4-phenylene and the like.

In formulae (M1) and (M2), Y is each independently a single bond or alkylene having 1 to 20 carbon atoms, wherein any —$CH_2$— in the alkylene can be substituted with —O—, —S—, —CH=CH—, —C≡C—, —COO— or —OCO—. Preferably, Y is a single bond, —$(CH_2)_r$—, —$O(CH_2)_r$— or —$(CH_2)_rO$— (in the aforementioned formulae, r is an integer from 1 to 20). Particularly preferably, Y is a single bond, —$(CH_2)_r$—, —$O(CH_2)_r$— or —$(CH_2)_rO$— (in the aforementioned formulae, r is an integer from 1 to 10). In view of the stability of compounds, preferably, —Y—$R^a$ and —Y—$R^b$ do not have —O—O—, —O—S—, —S—O— or —S—S— in the groups thereof.

In formulae (M1) and (M2), $Z^M$ is each independently a single bond, —$(CH_2)_q$—, —$O(CH_2)_q$—, —$(CH_2)_qO$—, —$O(CH_2)_qO$—, —CH=CH—, —C≡C—, —COO—, —OCO—, —$(CF_2)_2$—, —$(CH_2)_2$—COO—, —OCO—$(CH_2)_2$—, —CH=CH—COO—, —OCO—CH=CH—, —C≡C—COO—, —OCO—C≡C—, —CH=CH—$(CH_2)_2$—, —$(CH_2)_2$—CH=CH—, —CF=CF—, —C≡C—CH=CH—, —CH=CH—C≡C—, —$OCF_2$—$(CH_2)_2$—, —$(CH_2)_2$—$CF_2O$—, —$OCF_2$— or —$CF_2O$— (in the aforementioned formulae, q is an integer from 1 to 20).

Preferably, $Z^M$ is a single bond, —$(CH_2)_q$—, —$O(CH_2)_q$—, —$(CH_2)_qO$—, —CH=CH—, —C≡C—, —COO—, —OCO—, —$(CH_2)_2$—COO—, —OCO—$(CH_2)_2$—, —CH=CH—COO—, —OCO—CH=CH—, —$OCF_2$— or —$CF_2O$—.

In formulae (M1) and (M2), p is an integer from 1 to 6. Preferably, p is an integer from 1 to 3. When p is 1, the formulae represent a bicyclic compound having 2 rings such as 6-membered ring and the like. When p is 2 or 3, the formulae represent a tricyclic compound or a tetracyclic compound, respectively. For example, when p is 1, two $A^M$s may be the same or different. For example, when p is 2, three $A^M$s (or two $Z^M$s) may be the same or different. The same applies to the case where p is 3 to 6. The same applies to $R^a$, $R^b$, $R^d$, $Z^M$, $A^M$ and Y.

Compounds (M1) represented by formula (M1) and compounds (M2) represented by formula (M2) can be suitably used since they have the same properties even if they include an isotope such as $^2H$ (deuterium) and $^{13}C$ in an amount which is more than the amount represented by the naturally-occurring ratio.

More favorable examples of the compounds (M1) and (M2) include compounds (M1-1) to (M1-41) and (M2-1) to (M2-27) represented by the following formulae (M1-1) to (M1-41) and (M2-1) to (M2-27). In these compounds, meanings of $R^a$, $R^b$, $R^d$, $Z^M$, $A^M$, Y and p are the same as those in the formulae (M1) and (M2) described in the embodiment of the invention.

Hereinafter, partial structures as shown below in the compounds (M1-1) to (M1-41) and (M2-1) to (M2-27) will be explained. The partial structure (a1) represents 1,4-phenylene in which any hydrogen is substituted with fluorine. The partial structure (a2) represents 1,4-phenylene in which any hydrogen can be substituted with fluorine. The partial structure (a3) represents 1,4-phenylene in which any hydrogen can be substituted with fluorine or methyl. The partial structure (a4) represents fluorene in which hydrogen at position 9 can be substituted with methyl.

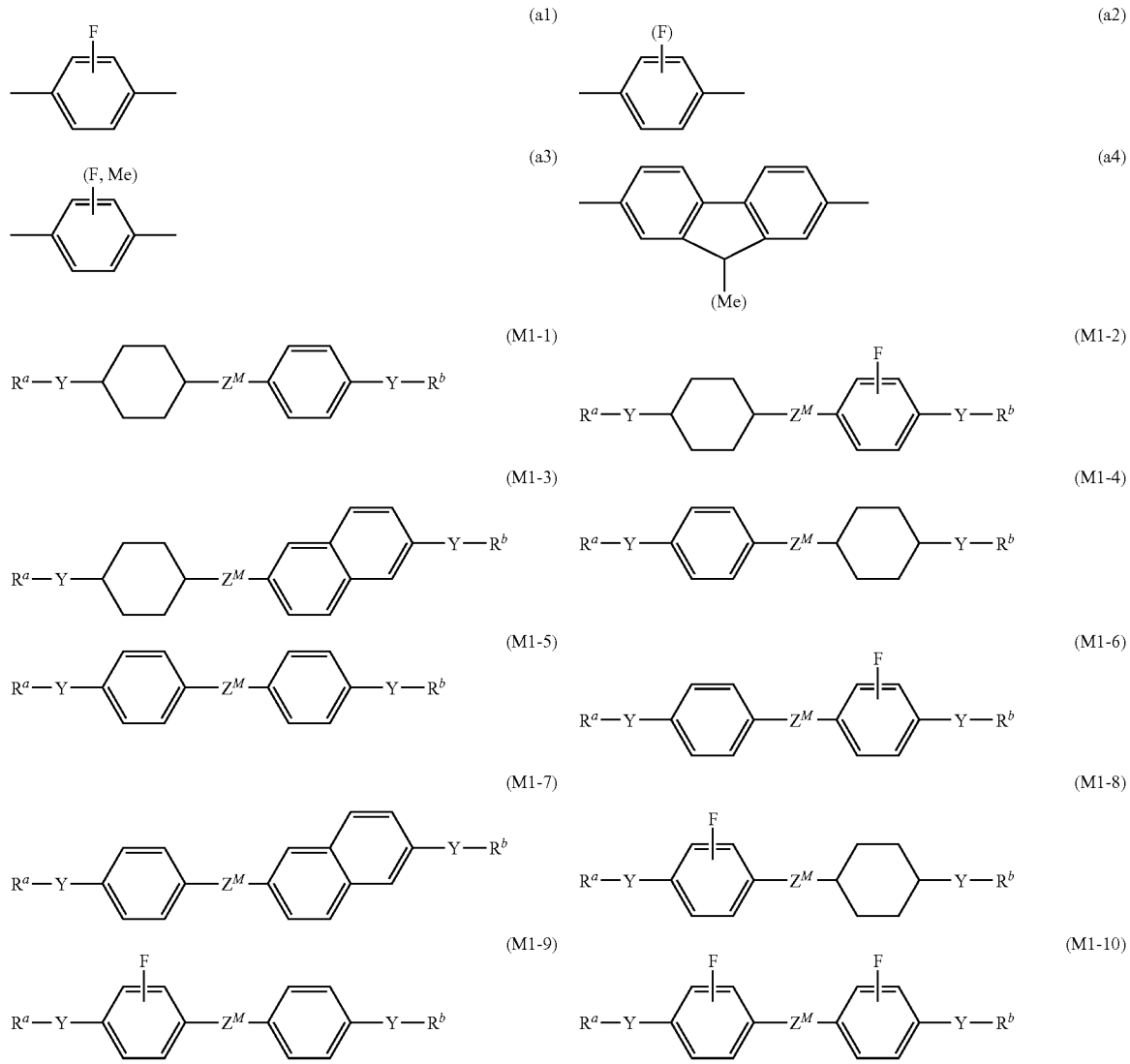

-continued
(M1-11) 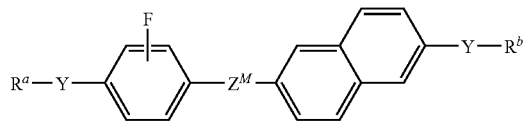
(M1-12) 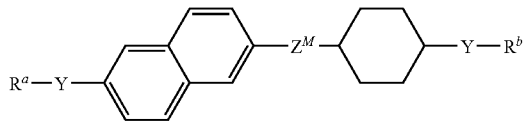
(M1-13) 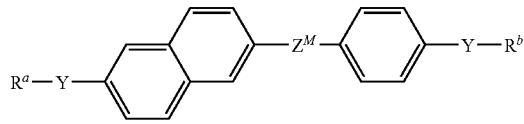
(M1-14) 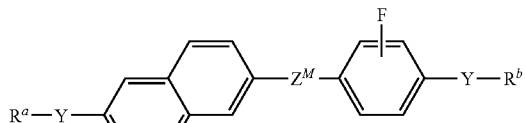
(M1-15) 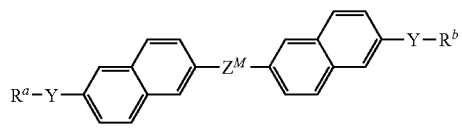
(M1-16) 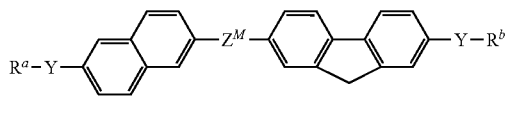
(M1-17) 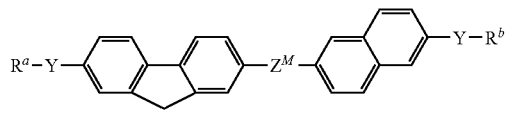
(M1-18) 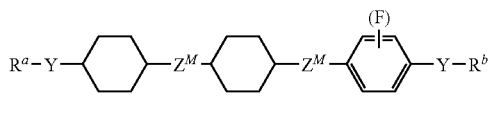
(M1-19) 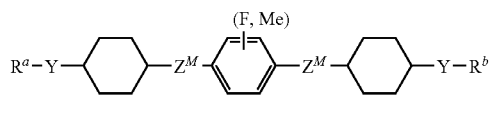
(M1-20) 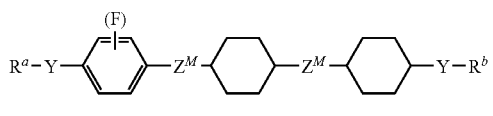
(M1-21) 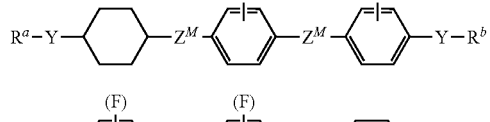
(M1-22) 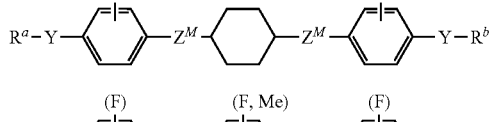
(M1-23) 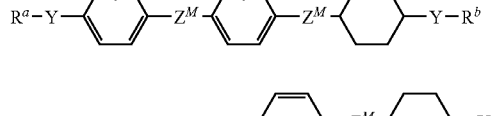
(M1-24) 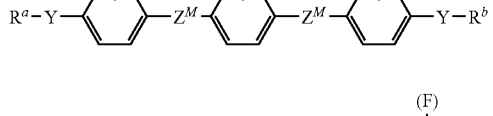
(M1-25) 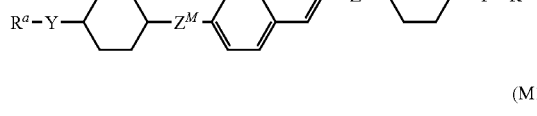
(M1-26) 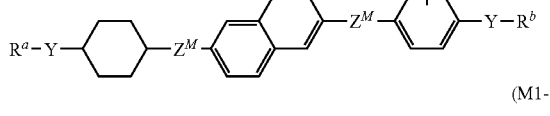
(M1-27) 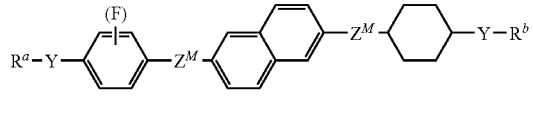
(M1-28) 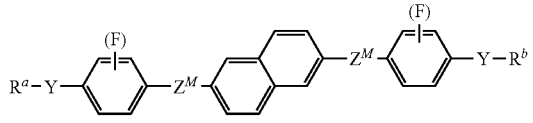
(M1-29)
(M1-30)

-continued
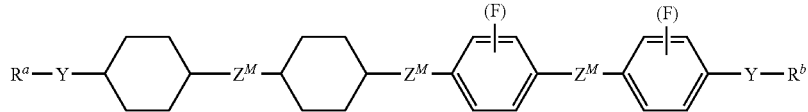
(M1-31)
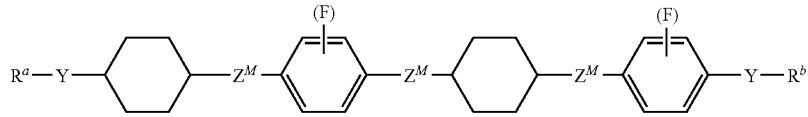
(M1-32)
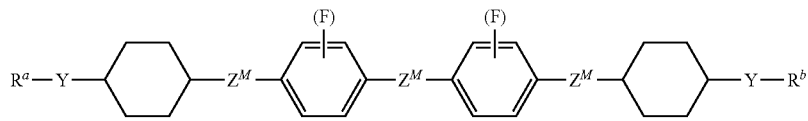
(M1-33)
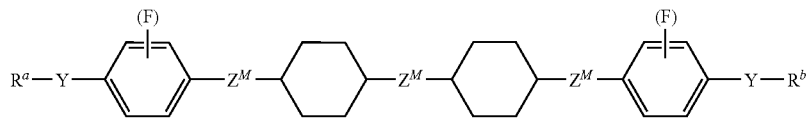
(M1-34)
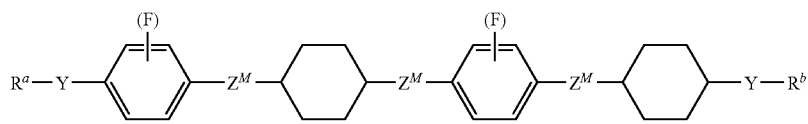
(M1-35)
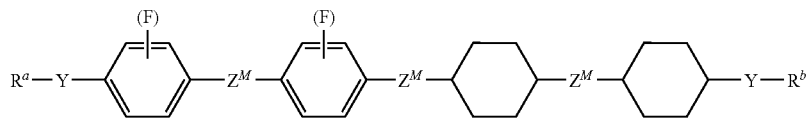
(M1-36)
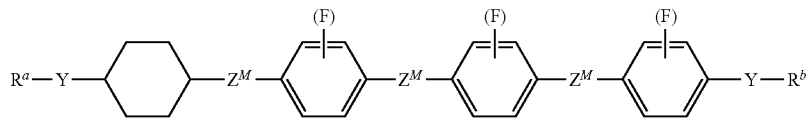
(M1-37)
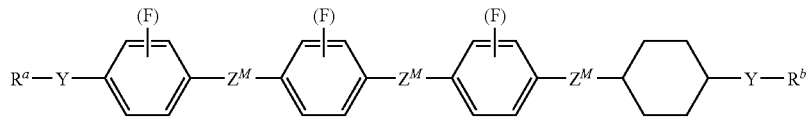
(M1-38)
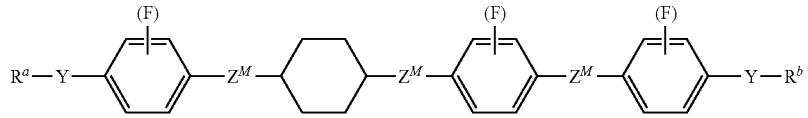
(M1-39)
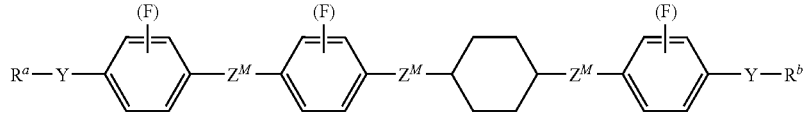
(M1-40)
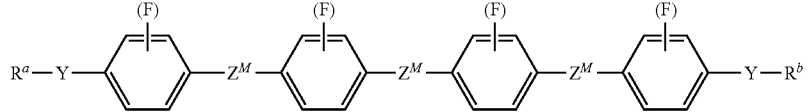
(M1-41)
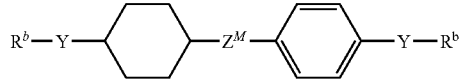
(M2-1)
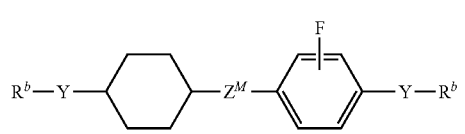
(M2-2)

-continued
(M2-3) 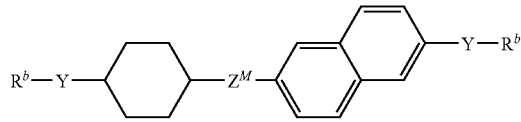
(M2-4) 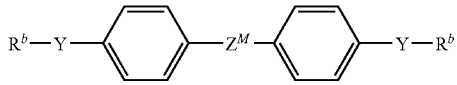
(M2-5) 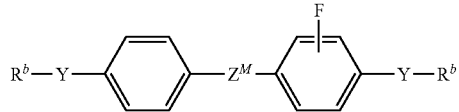
(M2-6) 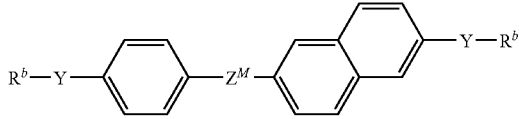
(M2-7) 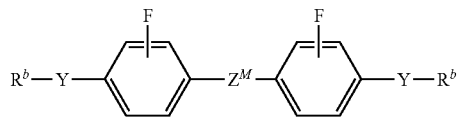
(M2-8) 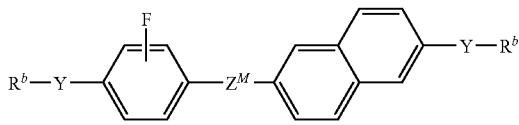
(M2-9) 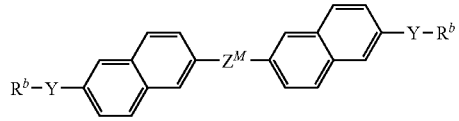
(M2-10) 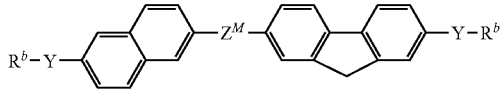
(M2-11) 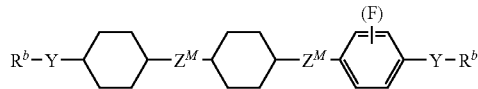
(M2-12) 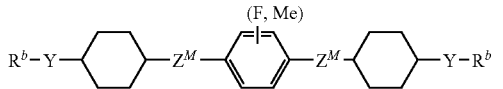
(M2-13) 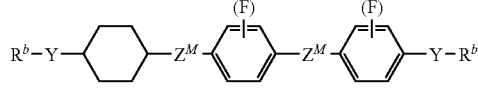
(M2-14) 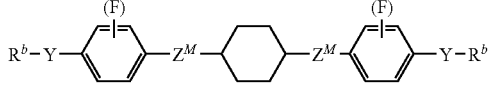
(M2-15) 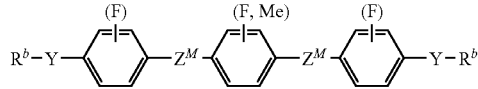
(M2-16) 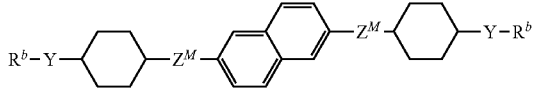
(M2-17) 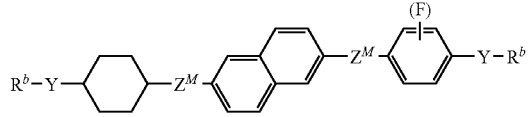
(M2-18) 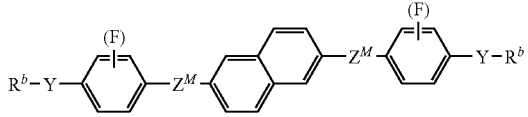
(M2-19) 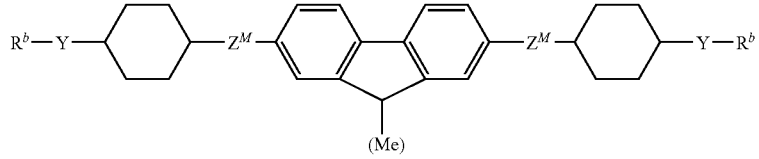
(M2-20) 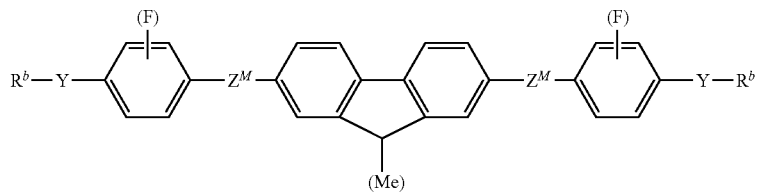
(M2-21) 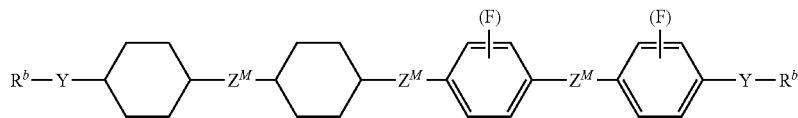

-continued

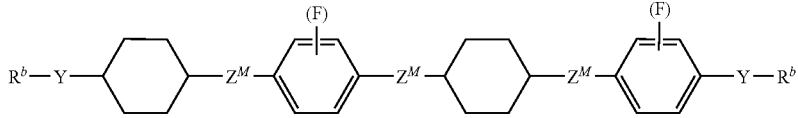
(M2-22)

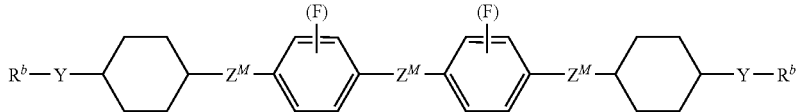
(M2-23)

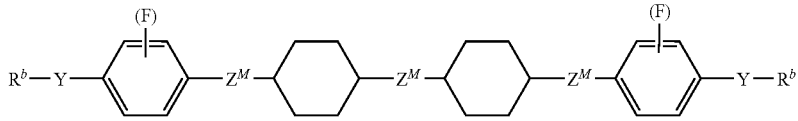
(M2-24)

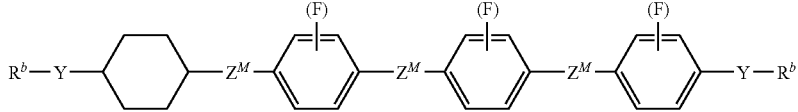
(M2-25)

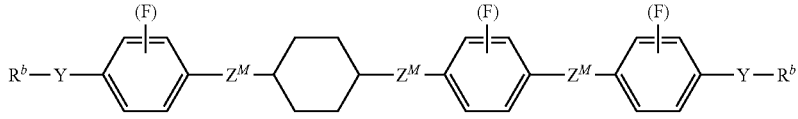
(M2-26)

(M2-27)

Monomers not having the aforementioned mesogenic moiety and polymerizable compounds other than the monomers (M1) and (M2) having the mesogenic moiety can be used according to need.

In order to optimize the optically isotropic liquid crystal phase of the polymer/liquid crystal composite of the invention, a monomer having the mesogenic moiety and 3 or more polymerizable functional groups can be used. As the monomer having the mesogenic moiety and 3 or more polymerizable functional groups, a publicly-known compound can be suitably used. Examples thereof include compounds represented by (M4-1) to (M4-3). More specifically, examples thereof include compounds described in Japanese Laid-Open Patent Publication Nos. 2000-327632, 2004-182949 and 2004-59772. In (M4-1) to (M4-3), meanings of $R^b$, Za, Y and (F) are the same as those described above.

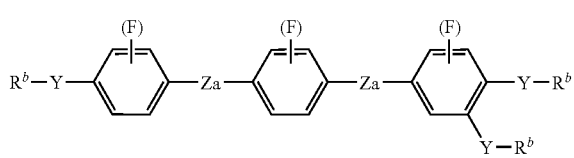
(M4-1)

-continued

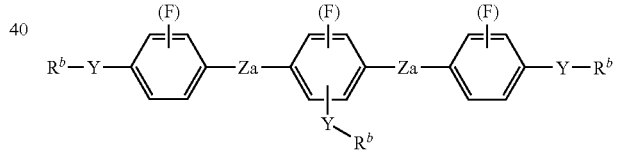
(M4-2)

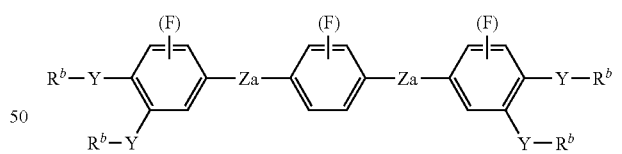
(M4-3)

Monomer Which Does Not Have the Mesogenic Moiety but has a Polymerizable Functional Group Examples of monomers which do not have the mesogenic moiety but have a polymerizable functional group include, but are not limited to, linear or branched acrylate having 1 to 30 carbon atoms and linear or branched diacrylate having 1 to 30 carbon atoms. Examples of monomers which do not have the mesogenic moiety but have 3 or more polymerizable functional groups include, but are not limited to, glycerol propoxylate (1 PO/OH) triacrylate, pentaerythritol propoxylate triacrylate, pentaerythritol triacrylate, trimethylolpropane ethoxylate triacrylate, trimethylolpropane propoxylate triacrylate, trimethylolpropane triacrylate, di(trimethylolpropane) tetraacrylate, pentaerythritol tetraacrylate, di(pentaerythritol) pentaacrylate, di(pentaerythritol) hexaacrylate, and trimethylolpropane triacrylate.

2.3. Polymerization Initiator

Polymerization reaction in the production of the polymer constituting the composite material of the present invention is not particularly limited. For example, photo radical polymerization, thermal radical polymerization, photo cation polymerization and the like can be conducted.

Examples of photo radical polymerization initiators, which can be used in photo radical polymerization, include DAROCUR® 1173 and 4265 (trade names; Ciba Specialty Chemicals Inc.) and IRGACURE® 184, 369, 500, 651, 784, 819, 907, 1300, 1700, 1800, 1850 and 2959 (trade names; Ciba Specialty Chemicals Inc.).

Examples of favorable initiators which can be used in thermal radical polymerization include benzoyl peroxide, diisopropyl peroxydicarbonate, t-butylperoxy-2-ethylhexanoate, t-butyl peroxypivalate, t-butyl peroxydiisobutyrate, lauroyl peroxide, dimethyl 2,2'-azobis(isobutyrate) (MAIB), di-t-butylperoxide (DTBPO), azobisisobutyronitrile (AIBN), and azobiscyclohexanecarbonitrile (ACN).

Examples of photo cation polymerization initiators, which can be used in photo cation polymerization, include diaryliodonium salt (hereinafter referred to as "DAS"), triarylsulfonium salt (hereinafter referred to as "TAS") and the like.

Examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium-p-toluene sulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium-p-toluene sulfonate and the like.

DAS can be supersensitized by adding thereto a photosensitizer such as thioxanthone, phenothiazine, chlorothioxanthone, xanthone, anthracene, diphenylanthracene, rubrene and the like.

Examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium-p-toluene sulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium-p-toluene sulfonate and the like.

Examples of specific trade names of photo cation polymerization initiators include: Cyracure® UVI-6990, Cyracure® UVI-6974 and Cyracure® UVI-6992 (trade names, UCC); ADEKA OPTOMER SP-150, SP-152, SP-170 and SP-172 (trade names, ADEKA Corporation); Rhodorsil Photoinitiator 2074 (trade name, Rhodia Japan, Ltd.); IRGACURE® 250 (trade name, Ciba Specialty Chemicals Inc.); UV-9380C (trade name, GE Toshiba Silicones Co., Ltd.) and the like.

2.4. Curing Agent and the Like

In the production of the polymer constituting the composite material of the invention, in addition to the aforementioned monomers and the like and the polymerization initiator, one or more types of other suitable components, e.g., a curing agent, a catalyst, a stabilizer and the like can also be added.

As the curing agent, a conventionally known latent curing agent, which is used as a curing agent for epoxy resin, can be generally used. Examples of latent curing agents for epoxy resin include amine-based curing agents, novolac resin-based curing agents, imidazole-based curing agents, acid anhydride-based curing agents and the like. Examples of amine-based curing agents include: aliphatic polyamines such as diethylenetriamine, triethylenetetraamine, tetraethylenepentaamine, m-xylenediamine, trimethylhexamethylenediamine, 2-methylpentamethylenediamine and diethylaminopropylamine; alicyclic polyamines such as isophoronediamine, 1,3-bisaminomethylcyclohexane, bis(4-aminocyclohexyl)methane, norbornenediamine, 1,2-diaminocyclohexane and Laromin; and aromatic polyamines such as diaminodiphenylmethane, diaminodiphenylethane and meta-phenylenediamine.

Examples of novolac resin-based curing agents include phenol novolac resin and bisphenol novolac resin. Examples of imidazole-based curing agents include 2-methylimidazole, 2-ethylhexylimidazole, 2-phenylimidazole and 1-cyanoethyl-2-phenylimidazolium trimellitate.

Examples of acid anhydride-based curing agents include tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride and benzophenone tetracarboxylic dianhydride.

Moreover, a curing accelerator can be additionally used in order to accelerate curing reaction between a polymerizable compound having a glycidyl group, an epoxy group or an oxetanyl group and a curing agent. Examples of curing accelerators include: tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organic phosphorus-based compounds such as triphenylphosphine; quaternary phosphonium salts such as tetraphenylphosphoniumbromide; diazabicycloalkenes such as 1,8-diazabicyclo[5.4.0]undecene-7, organic acid salt thereof and the like; quaternary ammonium salts such as tetraethylammoniumbromide and tetrabutylammoniumbromide; and boron compounds such as boron trifluoride and triphenylborate. These curing accelerators can be used solely or in combination.

For example, in order to prevent undesired polymerization during preservation, a stabilizer is preferably added. As the stabilizer, any compound known as a stabilizer in the art can be used. Typical examples of stabilizers include 4-ethoxyphenol, hydroquinone and butylated hydroxytoluene (BHT).

3. Content Percentage of Liquid Crystal Material and the Like

The content percentage of the liquid crystal material in the polymer/liquid crystal composite of the invention (e.g., the liquid crystal composition B) is preferably as high as possible within a range in which the composite can exhibit the optically isotropic liquid crystal phase. The higher the content percentage of the liquid crystal material, the higher the Kerr constant of the composite of the invention.

In the polymer/liquid crystal composite of the invention, the content percentage of the liquid crystal material is preferably approximately 60 to approximately 99 wt %, more preferably approximately 60 to approximately 95 wt %, and particularly preferably approximately 65 to approximately 95 wt % of the total amount of the composite. The content percentage of the polymer is preferably approximately 1 to approximately 40 wt %, more preferably approximately 5 to approximately 40 wt %, and particularly preferably approximately 5 to approximately 35 wt % of the total amount of the composite.

4. Others

The polymer/liquid crystal composite of the invention may contain, for example, a dichroism pigment, a photochromic compound or the like within a range in which the effects of the present invention are not reduced.

Positive/negative of the dielectric anisotropy of the liquid crystal composition a of the invention is not particularly limited, but positive is preferable. With respect to the absolute value of the value of dielectric anisotropy of the liquid crystal composition a ($\Delta\in$) and the value of optical anisotropy anisotropy ($\Delta n$), the higher these values, the higher the electric birefringence, and therefore these values are preferably as high as possible.

EXAMPLES

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

In the examples of the specification, "I" represents the non-liquid crystalline isotropic phase; "N" represents the nematic phase; "N*" represents the chiral nematic phase; and "BP" and "BPX" represent the blue phase or the optically isotropic liquid crystal phase. Coexistence state of two phases is sometimes described in the following form: (N*+I), (N*+BP), etc. Specifically, (N*+I) represents a phase in which the non-liquid crystalline isotropic phase and the chiral nematic phase coexist, and (N*+BP) represents a phase in which the BP phase or the optically isotropic liquid crystal phase and the chiral nematic phase coexist. "Un" represents an unconfirmed phase which is not optically isotropic.

In the specification, I-N phase transition point is sometimes referred to as N-I point, and I-N* transition point is sometimes referred to as N*-I point. Further, I-BP phase transition point is sometimes referred to as BP-I point.

In the examples of the specification, measurement/calculation of values of physical properties and the like is made according to the method described in the Standard of Electronic Industries Association of Japan, EIAJ•ED-2521A, unless otherwise indicated. Specific methods of measurement, calculation and the like are as described below.

Phase Transition Point

A sample was placed on a hotplate of a melting-point measuring apparatus equipped with a polarization microscope. Initially, under crossed nicols, temperature was elevated to the point at which the sample becomes the non-liquid crystalline isotropic phase, and thereafter temperature was lowered at the rate of 1° C./minute, and the chiral nematic phase or the optically anisotropic phase was allowed to be completely exhibited. Phase transition temperature in the process was measured. Next, temperature was elevated at the rate of 1° C./minute, and phase transition temperature in this process was measured. When it was difficult to determine the phase transition point in the optically isotropic liquid crystal phase in dark field under crossed nicols, a polarization plate was inclined at an angle of 1 to 10° from the state of the crossed nicols to measure the phase transition temperature.

Method for Calculating a Liquid Crystal Phase-Non-Liquid Crystalline Isotropic Phase Transition Point Using an Extrapolation Method A nematic liquid crystal composition including 85 wt % of mother liquid crystal having the nematic phase and 15 wt % of liquid crystalline compound or liquid crystalline composition was prepared. Linear extrapolation was made using the liquid crystal phase-non-liquid crystalline isotropic phase transition points of the mother liquid crystal and the liquid crystalline compound or liquid crystalline composition to determine the liquid crystal phase-non-liquid crystalline isotropic phase transition point of the liquid crystalline compound or the liquid crystalline composition.

Lower Limit of Temperature of Nematic Phase (TC; ° C.)

A sample having the nematic phase was put into a glass bottle, and it was held in a freezer at 0° C., −10° C., −20° C., −30° C. and −40° C. for 10 days, and thereafter the liquid crystal phase was observed. For example, regarding the case where the nematic phase remained in the sample at −20° C. and it changed to crystal or smectic phase at −30° C., it was described as TC≦−20° C. The lower limit of temperature of the nematic phase is sometimes abbreviated as "lower limit of temperature."

Viscosity ($\eta$; Measured at 20° C.; mPa·s)

An E-type viscometer was used to measure viscosity.

Optical Anisotropy (Refractive Index Anisotropy; $\Delta n$; Measured at 25° C.):

Measurement was conducted with an Abbe refractometer, in which a polarization plate is provided to an eyepiece, using light having a wavelength of 589 nm. After the surface of a main prism was rubbed in one direction, the sample was dropped on the main prism. The refractive index n∥ was measured when the direction of polarized light was parallel to the direction of rubbing. The refractive index n⊥ was measured when the direction of polarized light was perpendicular to the direction of rubbing. Calculation was made using the following formula: $\Delta n = n\| - n\bot$.

Dielectric Anisotropy ($\Delta\in$; Measured at 25° C.)

1. Liquid Crystal Composition a Whose Dielectric Anisotropy is Positive

The sample was put into a TN cell in which the gap between two glass substrates was about 9 μm and the twist angle was 80°. A sine wave (10V, 1 kHz) was applied on the cell, and 2 seconds later, the permittivity of liquid crystal molecules in the major axis direction ($\in\|$) was measured. A sine wave (0.5V, 1 kHz) was applied on the cell, and 2 seconds later, the permittivity of liquid crystal molecules in the minor axis direction ($\in\bot$) was measured. The value of dielectric anisotropy was calculated using the following formula: $\Delta\in = \in\| - \in\bot$.

2. Liquid Crystal Composition a Whose Dielectric Anisotropy is Negative

The sample was put into a liquid crystal cell treated to have a homeotropic alignment in which the gap between two glass substrates was about 9 μm. A sine wave (0.5V, 1 kHz) was applied on the cell, and 2 seconds later, the permittivity ($\in\|$) was measured. Further, the sample was put into a liquid crystal cell treated to have a homogeneous alignment in which the gap between two glass substrates was about 9 μm. A sine wave (0.5V, 1 kHz) was applied on the cell, and 2 seconds later, the permittivity ($\in\bot$) was measured. The value of dielectric anisotropy was calculated using the following formula: $\Delta\in = \in\| - \in\bot$.

Voltage Holding Ratio (VHR; Measured at 25° C.; %)

The TN element used in the measurement had a polyimide-aligned film, and the cell gap was 6 μm. After putting the sample into the element, it was sealed with an adhesive which is polymerized by ultraviolet. A pulse voltage (5V for 60 μs) was applied on the TN element for charging. Attenuating voltage was measured for 16.7 msec using a high-speed voltmeter, and an area between the voltage curve and the horizontal axis in a cycle was calculated. Further, from the wave pattern of voltage measured after removing the TN element, an area was similarly calculated. Voltage holding ratio was calculated by comparison between the two areas.

Pitch (P; Measured at 25° C.; nm)

Pitch length was measured using selective reflection (Handbook of Liquid Crystal, page 196 (published in 2000, Maruzen)). The selective reflection wavelength λ satisfies the following relational expression: $<n>p/\lambda=1$. $<n>$ represents the average refractive index, which is calculated using the following formula: $<n>=\{(n\|^2+n\bot^2)/2\}^{1/2}$. The selective reflection wavelength was measured using a microspectrophotometer (JEOL Ltd., trade name: MSV-350). The pitch was calculated by dividing the obtained reflection wavelength by the average refractive index.

The pitch of cholesteric liquid crystal having a reflection wavelength in a longer-wavelength region compared to visible light is proportional to the inverse number of the concentration of chiral dopants in a region where the concentration of the chiral dopant is low. Therefore, the pitch was determined by measuring pitch length of liquid crystal having a selective reflection wavelength in the visible light region at several points and applying the linear extrapolation method thereto.

Example 1

Preparation of Liquid Crystal Composition

A nematic liquid crystal composition A-1 was prepared by mixing compounds represented by the following formulae (a) to (f) and (g) in the weight ratio shown below. Specifically, the composition was prepared by mixing: compounds (a) and (b) having the clearing point (N-I point) of 250° C. or more, as compounds corresponding to the component 1 represented by the above-described formula (1); compound (g) having the K-I point of 49.8° C. and the clearing point of 7.7° C., as a compound corresponding to the component 2 represented by the above-described formula (3); and compounds (c) to (f). Values shown at the right side of values of the weight ratio are phase transition temperatures of respective compounds. The clearing point of the compound (g) was 7.7° C. The clearing point of the composition was given as an extrapolation value of N-I point, which was measured after mixing 15 wt % of compound (g) with the mother liquid crystal ZLI-1132 (manufactured by Merck).

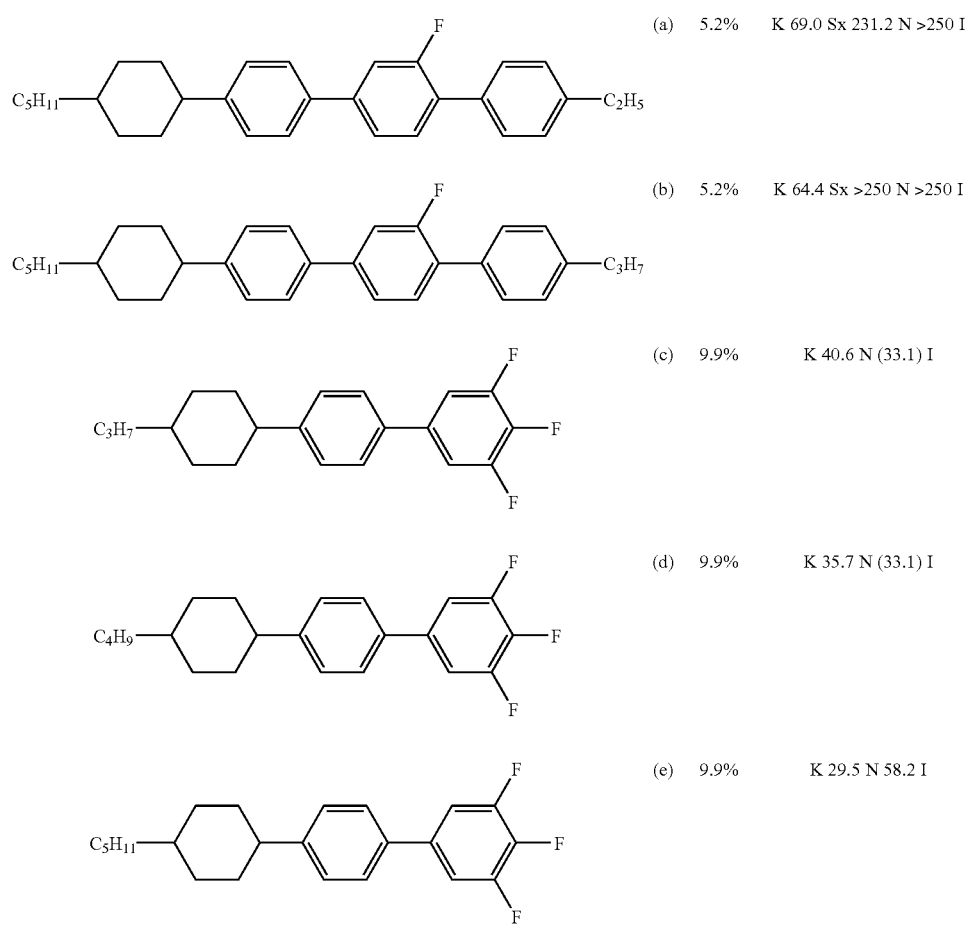

-continued

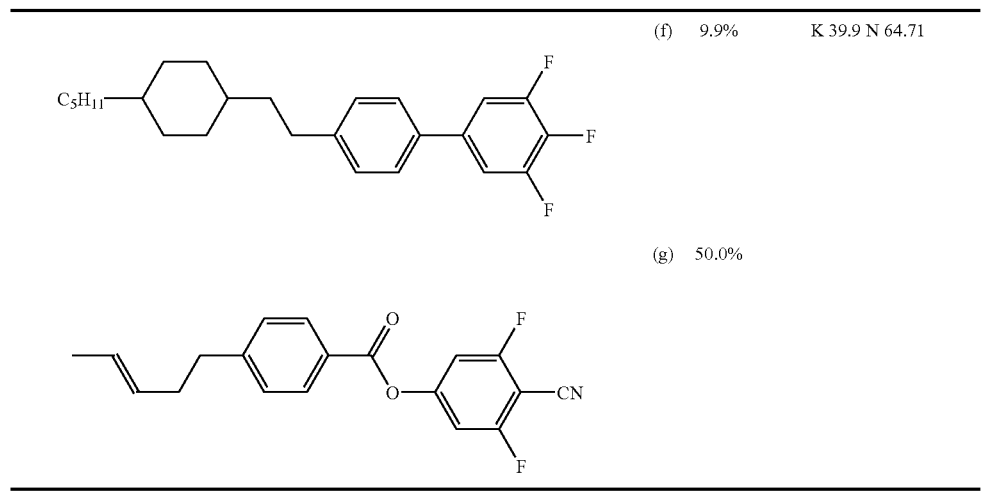

(f) 9.9%  K 39.9 N 64.71

(g) 50.0%

Next, a chiral dopant ISO-6OBA2 represented by the following formula was added to the liquid crystal composition A-1 to obtain liquid crystal compositions A-2, A-3, A-4 and A-5. Specifically, as shown in Table 1, liquid crystal compositions, in which the concentrations of chiral dopants are 2.9, 5.0, 8.1 and 10.0 wt %, respectively, were prepared and designated as liquid crystal compositions A-2, A-3, A-4 and A-5, respectively. Further, each of the liquid crystal compositions A-1 to A-5 was held in a cell consisting of two ITO-glasses which was not subjected to aligning treatment (cell thickness: 13 μm), and phase transition temperatures were measured using a polarization microscope.

TABLE 1

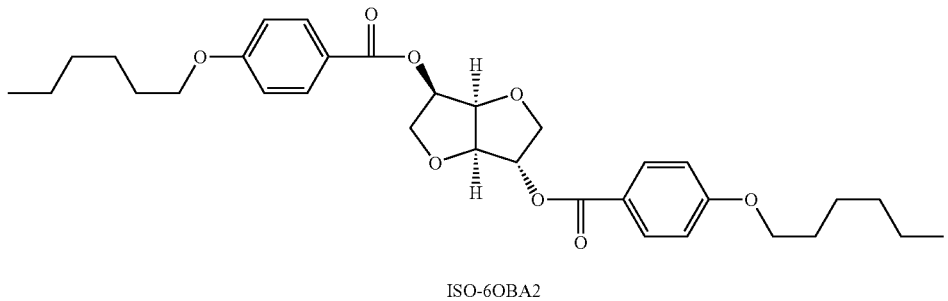

ISO-6OBA2

| Liquid crystal composition | ISO-6OBA2 concentration (wt %) | Conditions | Phase transition temperature (° C.) | N* + 1 temperature range (° C.) | BP temperature range (° C.) |
|---|---|---|---|---|---|
| A-1 | 0.0 | Lowering temperature(1° C./min) | I-60.0-(N + 1)-54.0-N | (6.0) | |
| | | Elevating temperature(1° C./min) | N-56.5-(N + 1)-62-I | | |
| A-2 | 2.9 | Lowering temperature(1° C./min) | I-54.7-(N* + 1)-48.6-N* | 6.1 | |
| | | Elevating temperature(1° C./min) | N*-51.5-(N* + 1)-57.3-I | | |
| A-3 | 5.0 | Lowering temperature(1° C./min) | I-50.9-(N* + 1)-42.9-N* | 8 | |
| | | Elevating temperature(1° C./min) | N*-45.3-(BP + N*)-46.1-BP-51.0-(N* + 1)-52.9-I | | 4.9 |
| A-4 | 8.1 | Lowering temperature(1° C./min) | I-42.9-(BP + 1)-38.0-BP-32.5-N* | | |
| | | Elevating temperature(1° C./min) | N*-34.7-BP-41.9-(BP + 1)-44.9-I | | 7.2~10.2 |
| A-5 | 10.0 | Lowering temperature(1° C./min) | | | |
| | | Elevating temperature(1° C./min) | N*-30.0-BP-40-I | | 10 |

Phase transition temperatures of the liquid crystal compositions A-1 to A-5 are as shown in Table 1. Specifically, in the case of the liquid crystal composition A-1, the difference between the upper limit (60° C.) and the lower limit (54° C.) of a temperature allowing coexistence of the nematic phase (N) and the non-liquid crystalline isotropic phase (I) (coexistence temperature range) in the lowered temperature process of −1° C./min was 6.0° C. In the case of the liquid crystal composition A-2, the difference between the upper limit (54.7° C.) and the lower limit (48.6° C.) of a temperature allowing coexistence of the chiral nematic phase (N*) and the non-liquid crystalline isotropic phase (I) (coexistence temperature range) in the lowered temperature process of −1° C./min was 6.1° C.

In the case of the liquid crystal composition A-3, in the elevated temperature process of 1° C./min, the difference between the upper limit (51.0° C.) and the lower limit (46.1° C.) of a temperature at which the optically isotropic liquid crystal phase was exhibited (BP temperature range) was 4.9° C.

In the case of the liquid crystal composition A-4, in the elevated temperature process of 1° C./min, the difference between the upper limit (41.9 to 44.9° C.) and the lower limit (34.7° C.) of a temperature at which the optically isotropic liquid crystal phase was exhibited (BP temperature range) was 7.2 to 10.2° C. Similarly, the BP temperature range of the liquid crystal composition A-5 was 10° C. Thus, the liquid crystal compositions A-4 and A-5 exhibited the optically isotropic liquid crystal phase in wide temperature ranges in the elevated temperature process. Therefore, among the liquid crystal compositions A-1 to A-5 in this example, A-3, A-4 and A-5 correspond to the liquid crystal composition B defined herein.

Moreover, according to the polarization microscope images of the liquid crystal composition A-2 in the lowered temperature process at 54.5° C., 52° C. and 49° C. (FIG. 1), it was found that the non-liquid crystalline isotropic phase coexists with the chiral nematic phase in the liquid crystal composition.

A mixture in which the compounds (a) and (b) corresponding to the component 1 were mixed in the same weight ratio as that in the liquid crystal compositions A-1 to A-5 (compound (a):compound (b)=5.2:5.2) was prepared. When the N-I point (clearing point) of the mixture ($T_1$) was measured, it was 270° C. or more. Since the N-I point (clearing point) of the liquid crystal composition A-1 (Tx) was 56.5° C., ($T_1$−Tx) was 213.5° C. or more. Further, since the N*-I point (clearing point) of the liquid crystal composition A-2 (Tx) was 51.5° C., ($T_1$−Tx) was 218.5° C. or more.

Similarly, values of $T_1$−T×B in the cases of the liquid crystal compositions A-3 to A-5 were as described below. T×B represents the clearing point of the liquid crystal composition B.

Liquid crystal composition A-3: $T_1$−$T×B$=270° C. or more−51.0° C.=219.0° C. or more Liquid crystal composition A-4: $T_1$−$T×B$=270° C. or more−41.9° C.=228.1° C. or more Liquid crystal composition A-5: $T_1$−$T×B$=270° C. or more−40° C.=230° C. or more Further, since the clearing point of the compound (g) corresponding to the component 2 is 7.7° C., $T_2$ of the liquid crystal compositions A-3, A-4 and A-5 is 7.7° C.

Since $T_1$ of the liquid crystal compositions A-3, A-4 and A-5 is 270° C., these liquid crystal compositions satisfy $T_1$>$T_2$.

Preparation of Mixture of Monomer and Liquid Crystal Material

As a mixture of the liquid crystal material and the monomer, 79.4 wt % of liquid crystal composition A-5, 8.6 wt % of trimethylolpropane triacrylate, 11.4 wt % of 1,4-di(4-(6-(acryloyloxy)hexyloxy)benzoyloxy)-2-methylbenzene and 0.6 wt % of 2,2'-dimethoxyphenylacetophenone (as a photopolymerization initiator) were mixed to prepare a liquid crystal composition A-5M.

Preparation of Polymer/Liquid Crystal Composite

The liquid crystal composition A-5M was held between a comb-like electrode substrate which is not subjected to alignment treatment and an opposed glass substrate (no electrode was provided thereto) (cell thickness: 12 μm), and the obtained cell was heated to have an isotropic phase at 35.0° C. In this state, ultraviolet (ultraviolet strength: 10 mWcm$^{-2}$ (365 nm)) was irradiated for 5 minutes to conduct polymerization reaction.

In the polymer/liquid crystal composite A-5P thus obtained, the optically isotropic liquid crystal phase, in which diffracted light with two or more colors was not shown even if cooled to temperature of 0° C. or lower, was maintained. That is, the temperature range in which the optically isotropic phase is exhibited was further broadened compared to the case of the liquid crystal composition A-5.

Figure 2:
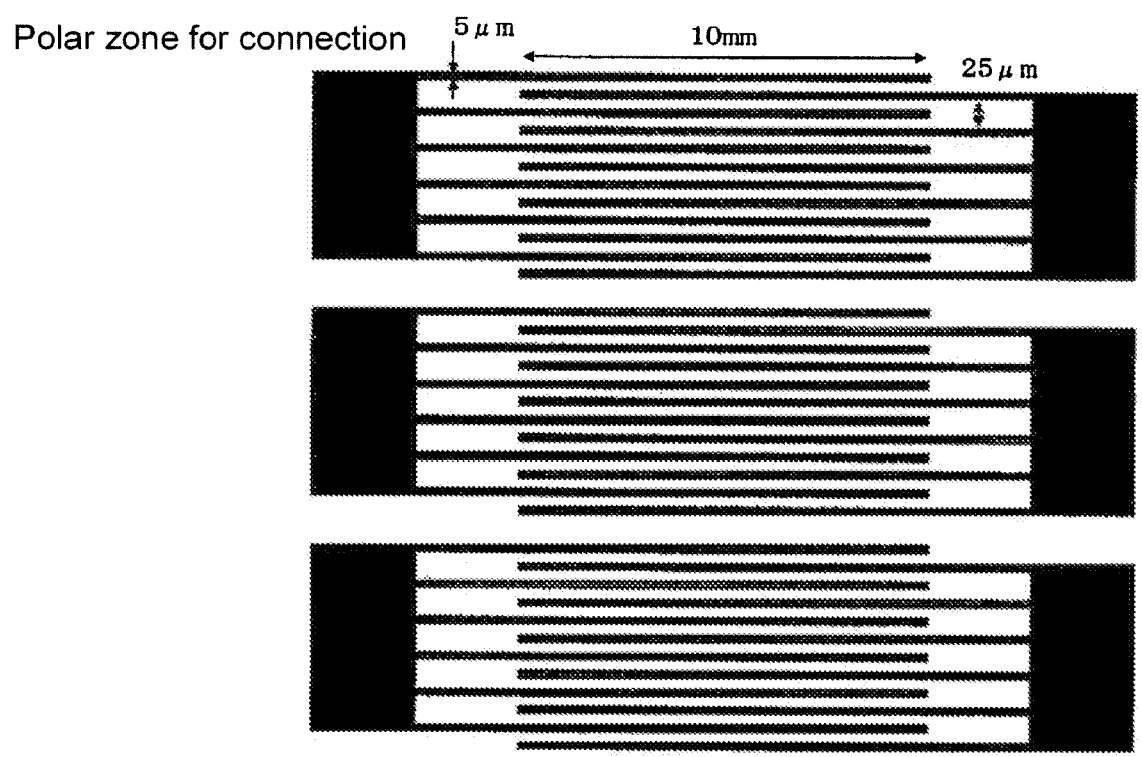
FIG. 2 shows a comb-like electrode substrate used in Example 1.

As shown in FIG. 2, as electrodes of the comb-like electrode substrate, an electrode 1 extending from the left side and an electrode 2 extending from the right side alternate with each other. Therefore, when there is a potential difference between the electrode 1 and the electrode 2, the comb-like electrode substrate as shown in FIG. 2 can provide a state in which two electric fields with different direction (upward and downward) are present.

Example 2

Figure 3:
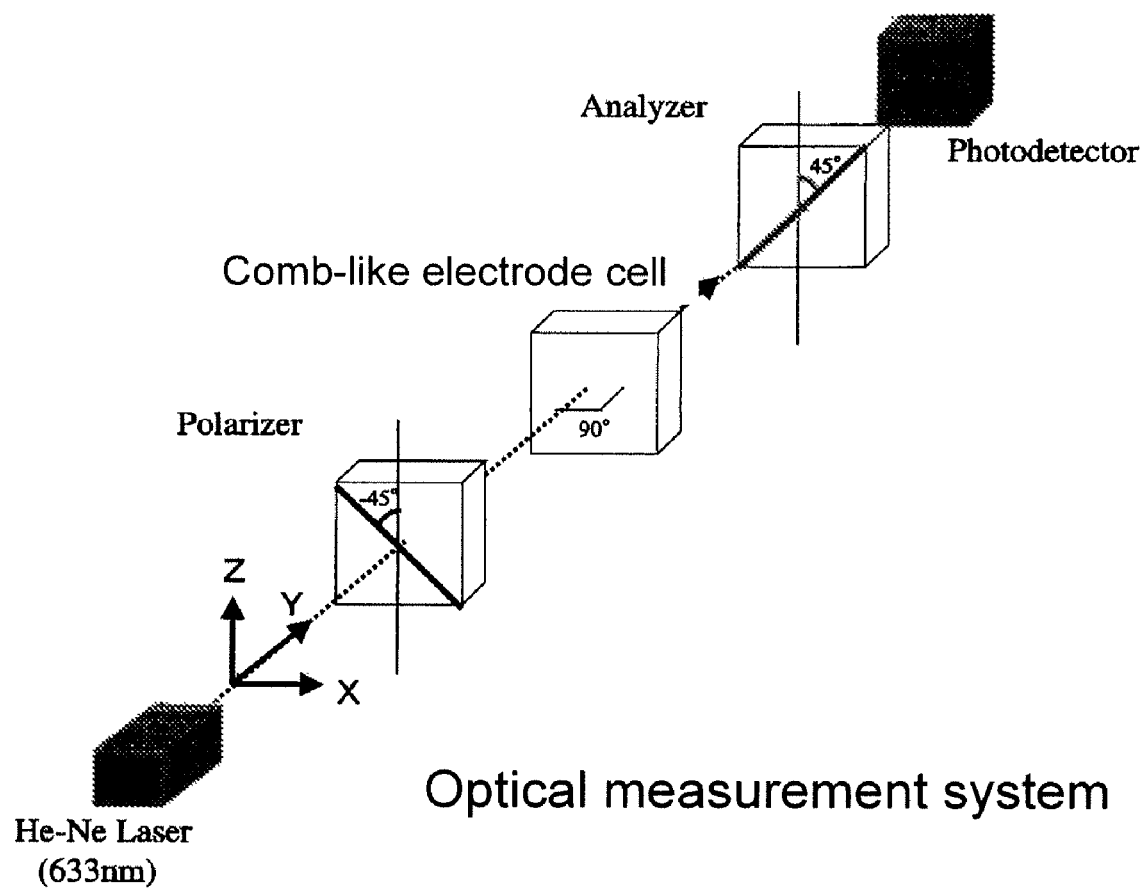
FIG. 3 shows an optical system used in Examples 2, 3 and 4.

A cell in which the polymer/liquid crystal composite A-5P obtained in Example 1 was held was set the optical system shown in FIG. 3 to measure electrooptic characteristics. The aforementioned cell was set in the optical system so that the incidence angle of laser light was perpendicular to the cell surface and the line direction of the comb-like electrode was 45° with respect to polarization plates of Polarizer and Analyzer, respectively. When a rectangular wave having the amplitude of 180 V was applied, the transmission rate was 88% at a measurement temperature of 20° C., and the transmitted light intensity was saturated. When detected using a photodetector, the transmitted light intensity at the time when no electric field was applied was 0.08, and the transmitted light intensity at the time when electric field was applied was 252. When the contrast was calculated, it was 3150. The response speed during rise time (time required for change of transmitted light intensity from 10% to 90% of the intensity at the time of applying electric field) was 170 μs, and the speed during fall time (time required for change of the transmitted light intensity from 90% to 10% of the intensity at the time of applying electric field) was 120 μs.

Further, even after removing electric field, residual birefringence was not observed. When turning on/off electric field was similarly tried with the temperature changed in a range of 0 to 35° C., it was confirmed that two states (a bright state and a dark state) appear within this temperature range.

Thus, in the case of the polymer/liquid crystal composite A-5P, two states (a bright state and a dark state) were successfully realized by turning on/off electric field, and high speed response was successfully realized even when electric field was applied until the transmission rate was saturated.

Example 3

Preparation of Liquid Crystal Composition

A nematic liquid crystal composition F-1 was prepared by mixing compounds represented by the following formulae (o-1), (o-2), (o-3) and (p) in the weight ratio described below. Specifically, the composition was prepared by mixing: compounds (o-1) to (o-3) having the N-I point (clearing point) of 250° C. or higher, as compounds corresponding to the component 1 represented by the above-described formula (1); and compound (p) having the K-I point of 21.4° C. and the clearing point (extrapolation value) of −41.6° C., as a compound corresponding to the component 2 represented by the above-described formula (3). Values shown at the right side of values of the weight ratio are phase transition temperatures of respective compounds.

F-2 and F-3. Specifically, as shown in Table 2, liquid crystal compositions, in which the concentrations of chiral dopants are 0.8 and 10.0 wt %, respectively, were prepared and designated as liquid crystal compositions F-2 and F-3, respectively. Further, each of the liquid crystal compositions F-2 and F-3 was held in a cell consisting of two ITO-glasses which was not subjected to aligning treatment (cell thickness: 13 μm), and phase transition temperatures were measured using a polarization microscope. In this regard, the clearing point of F-3 was determined as follows: the same cell as that used in Example 1 was used; an alternating sine wave (80 V) was applied on F-3 and observation was conducted using a polarization microscope; and a temperature at which the transmis-

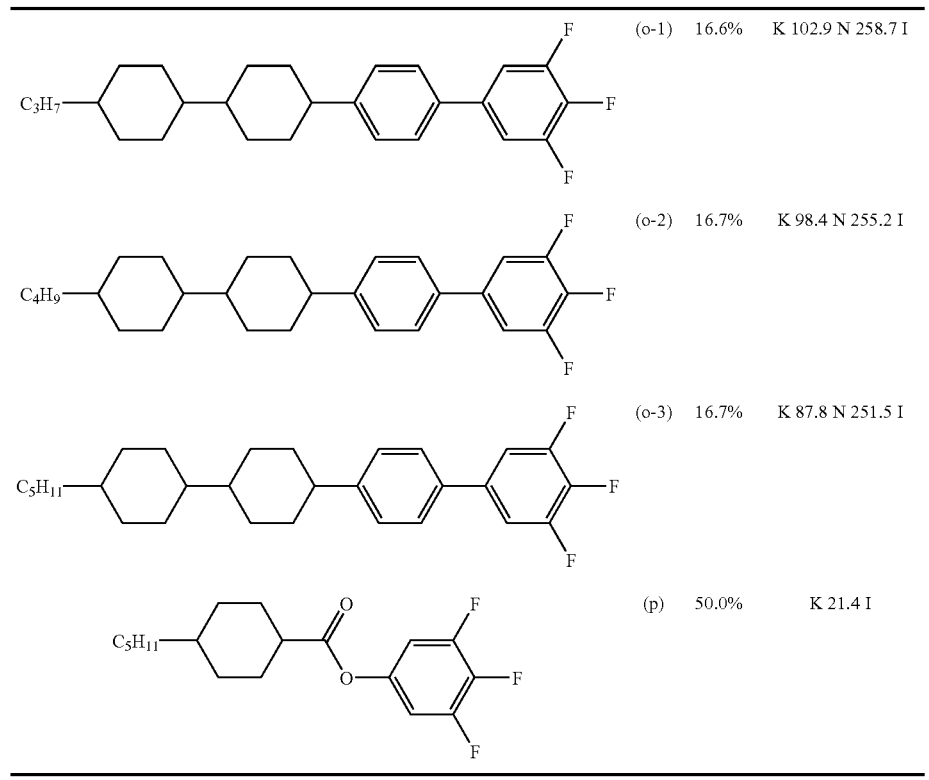

Next, a chiral dopant ISO-6OBA2 was added to the liquid crystal composition F-1 to obtain liquid crystal compositions sion rate was rapidly decreased under the elevated temperature condition was determined as the clearing point.

TABLE 2

| Liquid crystal composition | ISO-6OBA2 concentration (wt %) | Conditions | Phase transition temperature (° C.) | N* + I temperature range (° C.) | BP temperature range (° C.) |
|---|---|---|---|---|---|
| F-1 | 0.0 | Lowering temperature (1° C./min) | I – 98.7 – (N + I) – 85 – N | (13.7) | |
| | | Elevating temperature (1° C./min) | N – 89.2 – (N + I) – 101 – I | | |
| F-2 | 0.8 | Lowering temperature (1° C./min) | I – 97.2 – (N* + I) – 81 – N* | 16.2 | |
| | | Elevating temperature (1° C./min) | N* – 84 – (N* + I) – 101 – I | | |
| F-3 | 10.0 | Lowering | | | |

TABLE 2-continued

| Liquid crystal composition | ISO-6OBA2 concentration (wt %) | Conditions | Phase transition temperature (° C.) | N* + I temperature range (° C.) | BP temperature range (° C.) |
|---|---|---|---|---|---|
| | | temperature (1° C./min) Elevating temperature (1° C./min) | N* – 54 – (BPX or BP) – 74 – I | | 20 |

Phase transition temperatures of the liquid crystal compositions F-1 to F-3 were as shown in Table 2. Specifically, in the case of the liquid crystal composition F-1, the difference between the upper limit (98.7° C.) and the lower limit (85° C.) of a temperature allowing coexistence of the nematic phase (N) and the non-liquid crystalline isotropic phase (I) (coexistence temperature range) in the lowered temperature process of –1° C./min was 13.7° C. In the case of the liquid crystal composition F-2, the difference between the upper limit (97.2° C.) and the lower limit (81° C.) of a temperature allowing coexistence of the chiral nematic phase (N*) and the non-liquid crystalline isotropic phase (I) (coexistence temperature range) in the lowered temperature process of –1° C./min was 16.2° C.

In the case of the liquid crystal composition F-3, in the elevated temperature process of 1° C./min, the difference between the upper limit (74° C.) and the lower limit (54° C.) of a temperature at which the optically isotropic liquid crystal phase was exhibited (BP(X) or BP temperature range) was 20° C. Thus, the liquid crystal composition F-3 exhibited the optically isotropic liquid crystal phase in the wide temperature range in the elevated temperature process.

A mixture in which the compounds (o-1), (o-2) and (o-3) corresponding to the component 1 were mixed in the same weight ratio as that in the liquid crystal compositions F-1 to F-3 (compound (o-1):compound (o-2):compound (o-3)=16.6:16.7:16.7) was prepared. When the N-I point (clearing point) of the mixture ($T_1$) was measured, it was 254° C. Since the N-I point (clearing point) of the liquid crystal composition F-1 (Tx) was 89.2° C., ($T_1$–Tx) was 164.8° C. or more. Since the N*-I point (clearing point) of the liquid crystal composition F-2 (Tx) was 84° C., ($T_1$–Tx) was 170° C. Since the BP (or BPX)-I point (clearing point) of the liquid crystal composition F-3 (TxB) was 74° C., ($T_1$–TxB) was 180° C.

Further, since the clearing point of the compound (p) corresponding to the component 2 was –41.6° C., $T_2$ of the liquid crystal composition F-3 is –41.6° C.

Since $T_1$ of the liquid crystal composition F-3 is 254° C., these liquid crystal compositions satisfy $T_1 > T_2$.

Preparation of Mixture of Monomer and Liquid Crystal Material

As a mixture of the liquid crystal material and the monomer, 79.4 wt % of liquid crystal composition F-3, 8.6 wt % of dodecylacrylate, 11.4 wt % of 1,4-di(4-(6-(acryloyloxy)hexyloxy)benzoyloxy)-2-methylbenzene and 0.6 wt % of 2,2'-dimethoxyphenylacetophenone (as a photopolymerization initiator) were mixed to prepare a liquid crystal composition F-3M.

Preparation of Polymer/Liquid Crystal Composite

The liquid crystal composition F-3M was held between a comb-like electrode substrate which was not subjected to alignment treatment and an opposed glass substrate (no electrode was provided thereto) (cell thickness: 12 μm), and the obtained cell was heated to have an isotropic phase at 65.0° C. In this state, ultraviolet (ultraviolet strength: 10 mWcm$^{-2}$ (365 nm)) was irradiated for 5 minutes to conduct polymerization reaction.

In the polymer/liquid crystal composite F-3P thus obtained, the optically isotropic liquid crystal phase, in which diffracted light with two or more colors was not shown even if cooled to 30° C., was maintained. That is, the temperature range in which the optically isotropic phase is exhibited was further broadened compared to the case of the liquid crystal composition F-3.

As shown in FIG. 2, as electrodes of the comb-like electrode substrate, an electrode 1 extending from the left side and an electrode 2 extending from the right side alternate with each other. Therefore, when there is a potential difference between the electrode 1 and the electrode 2, the comb-like electrode substrate as shown in FIG. 2 can provide a state in which two electric fields with different direction (upward and downward) are present.

A cell in which the polymer/liquid crystal composite F-3P obtained in Example 3 was held was set in the optical system shown in FIG. 3 to measure electrooptic characteristics. The aforementioned cell was set in the optical system so that the incidence angle of laser light was perpendicular to the cell surface and the line direction of the comb-like electrode was 45° with respect to polarization plates of Polarizer and Analyzer, respectively. A rectangular wave having the amplitude of 180 V was applied with a measurement temperature of 55° C. It did not lead to saturation of the transmission rate, but a bright state was successfully realized. The response speed during rise time (time required for change of transmitted light intensity from 10% to 90% of the intensity at the time of applying electric field) was 250 μs, and the response speed during fall time (time required for change of the transmitted light intensity from 90% to 10% of the intensity at the time of applying electric field) was 110 μs.

Further, even after removing electric field, residual birefringence was not observed.

Thus, in the case of the polymer/liquid crystal composite F-3P, two states (a bright state and a dark state) were successfully realized by turning on/off electric field, and high speed response was successfully realized.

Example 4

Preparation of Liquid Crystal Composition

A nematic liquid crystal composition G-1 was prepared by mixing compounds represented by the following formulae (q-1), (q-2), (q-3), (c), (e), (r), (a) and (b) in the weight ratio described below. Specifically, the composition was prepared by mixing: compounds (a) and (b) having the N-I point (clearing point) of 250° C. or higher, as compounds corresponding to the component 1 represented by the above-described formula (1); compound (r) having the K-I point of 46.1° C. and the clearing point (extrapolation value) of –3.6° C., as a compound corresponding to the component 2 represented by the above-described formula (3); and other compounds (q-1) to (q-3), (c) and (e). Values shown at the right side of values of the weight ratio are phase transition temperatures of respective compounds.

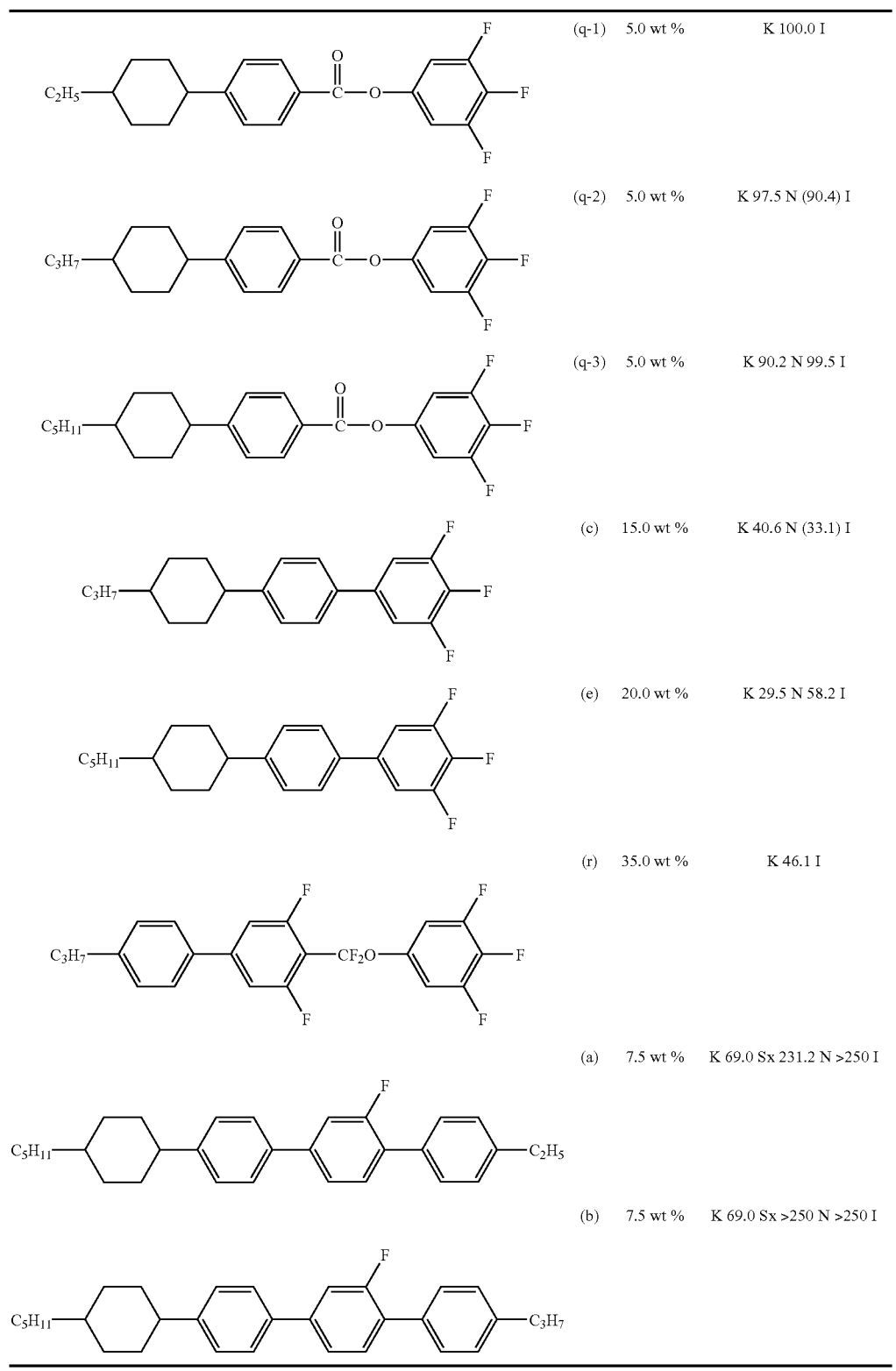

Next, a liquid crystal composition G-2 containing the liquid crystal composition G-1 and the chiral dopants ISO-6OBA2 in the weight ratio of 94/6 was obtained. Further, specifically, the liquid crystal composition G-2 was held in a cell consisting of two ITO-glasses which was not subjected to aligning treatment (cell thickness: 13 μm), and phase transition temperature was measured using a polarization microscope.

TABLE 3

| Liquid crystal composition | ISO-6OBA2 concentration (wt %) | Conditions | Phase transition temperature (° C.) | N* + I temperature range (° C.) | BP temperature range (° C.) |
|---|---|---|---|---|---|
| G-1 | 0.0 | Lowering temperature (1° C./min) | I – 76.2 – (N + I) – 66.2 – N | (10.0) | |
| | | Elevating temperature (1° C./min) | N – 71.0 – (N + I) – 79.1 – I | | |
| G-2 | 6.0 | Lowering temperature (1° C./min) | | | |
| | | Elevating temperature (1° C./min) | N* – 52.0 – BP(X) – 60.5 – (BP(X) + I) – 66.0 – I | | 7.5~14.0 |

In the case of the liquid crystal composition G-1, the difference between the upper limit (76.2° C.) and the lower limit (66.2° C.) of a temperature allowing coexistence of the nematic phase (N) and the non-liquid crystalline isotropic phase (I) (coexistence temperature range) in the lowered temperature process of –1° C./min was 10.0° C. Further, in the elevated temperature process of 1° C./min, the point of transition from the nematic phase (N) to a phase in which the nematic phase coexists with the non-liquid crystalline isotropic phase was 71.0° C.

In the case of the liquid crystal composition G-2, in the elevated temperature process of 1° C./min, the following phase transition was observed: N*52.0 BP (or BPX) 60.5 BP (or BPX)+I 66.0 I. The difference between the upper limit (60.5 to 66.0° C.) and the lower limit (52.0° C.) of a temperature at which the optically isotropic liquid crystal phase is exhibited (BPX or BP temperature range) was 7.5 to 14.0° C. Thus, the liquid crystal composition G-2 exhibited the optically isotropic liquid crystal phase in the wide temperature range in the elevated temperature process.

A mixture in which the compounds (a) and (b) corresponding to the component 1 were mixed in the same weight ratio as that in the liquid crystal compositions G-1 and G-2 (compound (a):compound (b)=7.5:7.5) was prepared. When the N-I point (clearing point) of the mixture ($T_1$) was measured, it was 270° C. or more. Since the N-I point (clearing point) of the liquid crystal composition G-1 (Tx) was 71.0° C., ($T_1$–Tx) was 199° C. or more. $T_1$–T×B in the case of the liquid crystal composition G-2 was as follows:

Liquid crystal composition G-2: $T_1$–T×B=270° C. or more–60.5° C.=209.5° C. or more.

Further, since the clear point of the compound (r) corresponding to the component 2 is –3.6° C., $T_2$ of the liquid crystal composition F-3 is –3.6° C.

Since $T_1$ of the liquid crystal composition F-3 is 270° C. or more, these liquid crystal compositions satisfy $T_1$>$T_2$.

Preparation of Mixture of Monomer and Liquid Crystal Material

As a mixture of the liquid crystal material and the monomer, 79.4 wt % of liquid crystal composition G-2, 10.0 wt % of dodecylacrylate, 10.0 wt % of 1,4-di(4-(6-(acryloyloxy)hexyloxy)benzoyloxy)-2-methylbenzene and 0.6 wt % of 2,2'-dimethoxyphenylacetophenone (as a photopolymerization initiator) were mixed to prepare a liquid crystal composition G-2M.

Preparation of Polymer/Liquid Crystal Composite

The liquid crystal composition G-2M was held between a comb-like electrode substrate which was not subjected to alignment treatment and an opposed glass substrate (no electrode was provided thereto) (cell thickness: 14 µm), and the obtained cell was maintained in the state of the non-liquid crystalline isotropic phase at 45.0° C. In this state, ultraviolet (ultraviolet strength: 10 mWcm$^{-2}$ (365 nm)) was irradiated for 5 minutes to conduct polymerization reaction.

In the polymer/liquid crystal composite G-2P thus obtained, the optically isotropic liquid crystal phase, in which diffracted light with two or more colors was not shown even if cooled to 25° C., was maintained. That is, the temperature range in which the optically isotropic phase is exhibited was further broadened compared to the case of the liquid crystal composition G-2.

As shown in FIG. 2, as electrodes of the comb-like electrode substrate, an electrode 1 extending from the left side and an electrode 2 extending from the right side alternate with each other. Therefore, when there is a potential difference between the electrode 1 and the electrode 2, the comb-like electrode substrate as shown in FIG. 2 can provide a state in which two electric fields with different direction (upward and downward) are present.

A cell in which the polymer/liquid crystal composite G-3P obtained in Example 4 was held was set in the optical system shown in FIG. 3 to measure electrooptic characteristics. The aforementioned cell was set in the optical system so that the incidence angle of laser light was perpendicular to the cell surface and the line direction of the comb-like electrode was 45° with respect to polarization plates of Polarizer and Analyzer, respectively. When a rectangular wave having the amplitude of 100 V was applied, the transmission rate was saturated at a measurement temperature of 35° C. At the time of applying voltage of 70 V, the response speed during rise time (time required for change of transmitted light intensity from 10% to 90% of the intensity at the time of applying electric field) was 1 msec, and the response speed during fall time (time required for change of the transmitted light intensity from 90% to 10% of the intensity at the time of applying electric field) was 0.7 msec.

Further, even after removing electric field, residual birefringence was not observed.

Thus, in the case of the polymer/liquid crystal composite G-2P, two states (a bright state and a dark state) were successfully realized by turning on/off electric field, and high speed response was successfully realized.

INDUSTRIAL APPLICABILITY

Examples of applications of the present invention include a liquid crystal material, a liquid crystal element using the liquid crystal material and the like.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal material contained in a polymer/liquid crystal composite comprising the liquid crystal material and a polymer for use in an element driven in a state of an optically isotropic liquid crystal phase, wherein the liquid crystal material exhibits the optically isotropic liquid crystal phase in the temperature range of approximately 4.8° C. or more in the elevated temperature process but does not exhibit a nematic phase.

2. The liquid crystal material according to claim 1, wherein the liquid crystal material is a composition consisting essentially of a liquid crystal composition A, wherein the difference between the upper limit and the lower limit of a temperature allowing coexistence of the nematic phase and a non-liquid crystalline isotropic phase or the difference between the upper limit and the lower limit of a temperature allowing coexistence of a chiral nematic phase and the non-liquid crystalline isotropic phase is approximately 3.0° C. to approximately 150° C., and wherein the optically isotropic liquid crystal phase is not exhibited in the elevated temperature process, and chiral dopants.

3. The liquid crystal material according to claim 1, wherein the liquid crystal material is a composition consisting essentially of a liquid crystal composition A, wherein the difference between the upper limit and the lower limit of a temperature allowing coexistence of the nematic phase and a non-liquid crystalline isotropic phase or the difference between the upper limit and the lower limit of a temperature allowing coexistence of a chiral nematic phase and the non-liquid crystalline isotropic phase is approximately 6.0° C. to approximately 150° C., and wherein the optically isotropic liquid crystal phase is not exhibited in the elevated temperature process, and chiral dopants.

4. The liquid crystal material according to claim 1, wherein the liquid crystal material is the liquid crystal composition B consisting essentially of the liquid crystal composition A, which does not exhibit the optically isotropic liquid crystal phase in the elevated temperature process, and the chiral dopants, and wherein the liquid crystal composition A comprises approximately 5 to approximately 80 wt % of component 1 having the clearing point $T_1$ and approximately 20 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geq 100°$ C.

5. The liquid crystal material according to claim 1, wherein the liquid crystal material is the liquid crystal composition B consisting essentially of the liquid crystal composition A, which does not exhibit the optically isotropic liquid crystal phase in the elevated temperature process, and the chiral dopants, and wherein the liquid crystal composition A comprises approximately 5 to approximately 70 wt % of component 1 having the clearing point $T_1$ and approximately 30 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geq 150°$ C.

6. The liquid crystal material according to claim 1, wherein the liquid crystal material is the liquid crystal composition B consisting essentially of the liquid crystal composition A, which does not exhibit the optically isotropic liquid crystal phase in the elevated temperature process, and the chiral dopants, and wherein the liquid crystal composition A comprises approximately 5 to approximately 70 wt % of component 1 having the clearing point $T_1$ and approximately 30 to approximately 95 wt % of component 2 having the clearing point $T_2$, and the clearing point $T_1$, the clearing point $T_2$ and the clearing point T×B of the liquid crystal composition B satisfy the following conditions:

$T_1 > T_2$ $T_1 - T \times B \geq 200°$ C.

7. The liquid crystal material according to claim 1, wherein the liquid crystal material is the liquid crystal composition B consisting essentially of the liquid crystal composition A, which does not exhibit the optically isotropic liquid crystal phase in the elevated temperature process, and the chiral dopants, and wherein the liquid crystal composition A comprises approximately 5 to approximately 80 wt % of component 1 having the clearing point $T_1$ and approximately 20 to approximately 95 wt % of component 2 having the clearing point $T_2$, and the clearing point $T_1$, the clearing point $T_2$ and the clearing point T×a of a liquid crystal composition a, in which all the chiral dopants are excluded from the liquid crystal composition A satisfy the following conditions:

$T_1 > T_2$ $T_1 - T \times a \geq 100°$ C.

8. The liquid crystal material according to claim 4, wherein the component 1 consists essentially of a liquid crystal compound having the clearing point of approximately 150° C. or higher and the component 2 consists of a liquid crystal compound having the clearing point of approximately 47° C. or lower.

9. The liquid crystal material according to claim 4, wherein the component 1 consists essentially of a compound represented by formula (1):

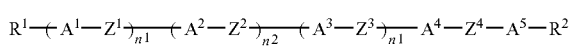

(1)

wherein:

$R^1$ is hydrogen or alkyl having 1 to 20 carbon atoms, wherein any —CH$_2$— in the alkyl can be substituted with —O—, —S—, —COO—, —OCO—, —CH=CH—, —CF=CF— or —C≡C—, and any hydrogen in the alkyl and an alkyl in which any —CH$_2$— is substituted with —O—, —S—, —COO—, —OCO—, —CH=CH—, —CF=CF— or —C≡C— can be substituted with halogen;

$R^2$ is hydrogen, halogen, —CN, —N=C=O, —N=C=S, —CF$_3$, —OCF$_3$ or alkyl having 1 to 20 carbon atoms, wherein any —CH$_2$— in the alkyl can be substituted with —O—, —S—, —COO—, —OCO—, —CH=CH—, —CF=CF— or —C≡C—, and any hydrogen in the alkyl and an alkyl in which any —CH$_2$— is substituted with —O—, —S—, —COO—, —OCO—, —CH=CH—, —CF=CF— or —C≡C— can be substituted with halogen, and —CH$_3$ in these alkyls can be substituted with —CN;

$A^1$ to $A^5$ are each independently an aromatic or nonaromatic 3- to 8-membered ring or a condensed ring having 9 or more carbon atoms, wherein: any hydrogen in these rings can be substituted with halogen, alkyl having 1 to 3 carbon atoms or alkyl halide; —CH$_2$— in the rings can be substituted with —O—, —S—, or —NH—; —CH= can be substituted with —N=; and $A^1$ to $A^5$ are not tetrahydropyran rings;

$Z^1$ to $Z^4$ are each independently a single bond or alkylene having 1 to 8 carbon atoms, wherein any —CH$_2$— in the alkylene can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene and an alkylene in which any —CH$_2$— is substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C— can be substituted with halogen; and $n^1$ to $n^3$ are each independently 0 or 1; when $R^2$ is hydrogen or fluorine, $n^2$ and $n^3$ are 1; when at least one of $Z^1$ to $Z^4$ is —CF$_2$O—, $n^2$ and $n^3$ are 1; when $Z^4$ is —COO—, $n^2$ and $n^3$ are 1; and only when at least one of $A^4$ and $A^5$ is a condensed ring having 9 or more carbon atoms, all of $n^1$ to $n^3$ can be 0.

10. The liquid crystal material according to claim 9, wherein:

$R^1$ is alkyl having 1 to 10 carbon atoms, wherein any —CH$_2$— in the alkyl can be substituted with —O—, —S—, —COO—, —OCO—, —CH=CH— or —C≡C—;

$R^2$ is halogen, —CN, —N=C=O, —N=C=S, —CF$_3$, —OCF$_3$ or alkyl having 1 to 20 carbon atoms, wherein any —CH$_2$— in the alkyl can be substituted with —O—, —CH=CH— or —C≡C—, and any hydrogen in the alkyl and an alkyl in which any —CH$_2$— is substituted with —O—, —CH=CH— or —C≡C— can be substituted with halogen, and —CH$_3$ in these alkyls can be substituted with —CN;

$A^1$ to $A^5$ are each independently a benzene ring, a naphthalene ring or a cyclohexane ring, wherein any hydrogen in these rings can be substituted with halogen, alkyl having 1 to 3 carbon atoms or alkyl halide, and —CH$_2$— in the rings can be substituted with —O— or —S—, and —CH= can be substituted with —N=; and $Z^1$ to $Z^4$ are each independently a single bond or alkylene having 1 to 4 carbon atoms, wherein any —CH$_2$— in the alkylene can be substituted with —O—, —S—, —COO—, —OCO—, —CSO—, —OCS—, —CH=CH—, —CF=CF— or —C≡C—, and any hydrogen in the alkylene and an alkylene in which any —CH$_2$— is substituted with —O—, —S—, —COO—, —OCO—, —CSO—, —OCS—, —CH=CH—, —CF=CF— or —C≡C— can be substituted with halogen.

11. The liquid crystal material according to claim 9, wherein:

$R^1$ is alkyl having 1 to 10 carbon atoms, wherein any —CH$_2$— nonadjacent to the aromatic ring in the alkyl can be substituted with —CH=CH—, and any —CH$_2$— in the alkyl or alkenyl can be substituted with —O—;

$R^2$ is fluorine, chlorine, —CN, —N=C=S or alkyl having 1 to 20 carbon atoms, wherein any —CH$_2$— in the alkyl can be substituted with —O—, —CH=CH— or —C≡C—, and any hydrogen in the alkyl and an alkyl in which any —CH$_2$— is substituted with —O—, —CH=CH— or —C≡C— can be substituted with halogen;

$A^1$ to $A^5$ are each independently a benzene ring, a naphthalene ring or a cyclohexane ring, wherein any hydrogen in the rings can be substituted with fluorine or chlorine, and —CH$_2$— can be substituted with —O— or —S—, and —CH= can be substituted with —N=; and $Z^1$ to $Z^4$ are each independently a single bond, —CF$_2$O— or —C≡C—.

12. The liquid crystal material according to claim 9, wherein:

$R^1$ is alkyl having 1 to 10 carbon atoms, wherein any —CH$_2$— nonadjacent to the aromatic ring in the alkyl can be substituted with —CH=CH—, and any —CH$_2$— in the alkyl or alkenyl can be substituted with —O—;

$R^2$ is fluorine, chlorine, —CN or alkyl having 1 to 10 carbon atoms, wherein any —CH$_2$— in the alkyl can be substituted with —O—, and any hydrogen in the alkyl and an alkyl in which any —CH$_2$— is substituted with —O— can be substituted with halogen;

$A^1$ to $A^5$ are each independently a benzene ring, a dioxane ring or a cyclohexane ring, wherein any hydrogen in the benzene ring can be substituted with fluorine or chlorine;

$Z^1$ to $Z^4$ are each independently a single bond or —C≡C—; and $n^1$ is 1, and $n^2$ and $n^3$ are 0.

13. The liquid crystal material according to claim 4, wherein the component 2 consists essentially of a compound represented by formula (2):

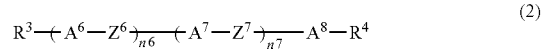

$$R^3\!-\!\!\left(\!A^6\!-\!Z^6\right)_{\!n6}\!\!\left(\!A^7\!-\!Z^7\right)_{\!n7}\!A^8\!-\!R^4 \qquad (2)$$

wherein:

$R^3$ is hydrogen or alkyl having 1 to 20 carbon atoms, wherein any —CH$_2$— in the alkyl can be substituted with —O—, —S—, —COO—, —OCO—, —CH=CH—, —CF=CF— or —C≡C—, and any hydrogen in the alkyl and an alkyl in which any —CH$_2$— is substituted with —O—, —S—, —COO—, —OCO—, —CH=CH—, —CF=CF— or —C≡C— can be substituted with halogen;

$R^4$ is halogen, —CN, —N=C=O, —N=C=S, —CF$_3$, —OCF$_3$, —C≡C—CN, —C≡C—CF$_3$ or —C≡C—CF$_3$;

$A^6$, $A^7$ and $A^8$ are each independently an aromatic or non-aromatic 3- to 8-membered ring or a condensed ring having 9 or more carbon atoms, wherein any hydrogen in these rings can be substituted with halogen, alkyl having 1 to 3 carbon atoms or alkyl halide; any —CH$_2$— in the rings can be substituted with —O—, —S—, or —NH—; and —CH= can be substituted with —N=;

$Z^6$ and $Z^7$ are a single bond or alkylene having 1 to 8 carbon atoms, wherein any —CH$_2$— in the alkylene can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene and an alkylene in which any —CH$_2$— is substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C— can be substituted with halogen; and $n^6$ and $n^7$ are 0 or 1, wherein both $n^6$ and $n^7$ are 1 only when at least one of $Z^6$ and $Z^7$ is —CF$_2$O—, and $n^6$ and $n^7$ are 0 when $A^7$ or $A^8$ is a condensed ring having 9 or more carbon atoms.

14. The liquid crystal material according to claim 13, wherein:

$R^3$ is alkyl having 1 to 10 carbon atoms, wherein any —CH$_2$— in the alkyl can be substituted with —O—, —S—, —COO—, —OCO—, —CH=CH— or —C≡C—;

$R^4$ is halogen, —CN, —N=C=S, —CF$_3$, —C≡C—CN or —C≡C—CF$_3$;

$A^6$, $A^7$ and $A^8$ are each independently a benzene ring, a naphthalene ring or a cyclohexane ring, wherein any hydrogen in these rings can be substituted with halogen; any —CH$_2$— in the rings can be substituted with —O— or —S—; and —CH= can be substituted with —N=; and $Z^6$ and $Z^7$ are a single bond or alkylene having 1 to 4 carbon atoms, wherein any —CH$_2$— in the alkylene can be substituted with —O—, —S—, —COO—, —OCO—, —CSO—, —OCS—, —CH=CH—, —CF=CF— or —C≡C—; and any hydrogen in the alkylene and an alkylene in which any —CH$_2$— is substituted with —O—, —S—, —COO—, —OCO—, —CSO—, —OCS—, —CH=CH—, —CF=CF— or —C≡C— can be substituted with halogen.

15. The liquid crystal material according to claim 13, wherein:

$R^3$ is alkyl having 1 to 10 carbon atoms, wherein any —CH$_2$— nonadjacent to the aromatic ring in the alkyl can be substituted with —CH=CH—;

$R^4$ is halogen, —CN, —N=C=S, —CF$_3$, —OCF$_3$, —C≡C—CN, —CH=CH—CF$_3$ or —C≡C—CF$_3$;

$A^6$, $A^7$ and $A^8$ are each independently a benzene ring, a naphthalene ring or a cyclohexane ring, wherein any hydrogen in these rings can be substituted with fluorine or chlorine; any —CH$_2$— in these rings can be substituted with —O—; and —CH= can be substituted with —N=; and $Z^6$ and $Z^7$ are each independently a single bond, —COO—, —CF$_2$O— or —C≡C—.

16. The liquid crystal material according to claim 13, wherein:

$R^3$ is alkyl having 1 to 10 carbon atoms, wherein any —CH$_2$— nonadjacent to the aromatic ring in the alkyl can be substituted with —CH=CH—;

$R^4$ is halogen or —CN;

$A^7$ and $A^8$ are each independently a benzene ring, a dioxane ring or a cyclohexane ring, wherein any hydrogen in the benzene ring can be substituted with fluorine;

$Z^7$ is a single bond or —COO—; and $n^6$ is 0 and $n^7$ is 0 or 1.

17. The liquid crystal material according to claim 4, wherein the component 2 consists essentially of a compound represented by formula (3):

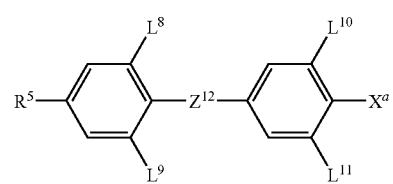

wherein:

$R^5$ is alkyl having 1 to 10 carbon atoms, wherein any —CH$_2$— in the alkyl can be substituted with —O—, —S—, —COO—, —OCO—, —CH=CH—, —CF=CF— or —C≡C—; and any hydrogen in the alkyl can be substituted with halogen;

$X^a$ is fluorine, chlorine, —CN, —N=C=S, —CF$_3$, —OCF$_3$, —C≡C—CN, —CH=CH—CF$_3$ or —C≡C—CF$_3$;

$Z^{12}$ is a single bond, —COO—, —CF$_2$O— or —C≡C—; and $L^8$ to $L^{11}$ are each independently hydrogen or fluorine.

18. The liquid crystal material according to claim 17, wherein:

$R^5$ is alkyl having 1 to 10 carbon atoms, wherein any —CH$_2$— nonadjacent to the aromatic ring in the alkyl can be substituted with —CH=CH—;

$X^a$ is fluorine or —CN;

$Z^{12}$ is —COO—; and $L^8$ to $L^{11}$ are each independently hydrogen or fluorine, wherein at least two of them are fluorine.

19. The liquid crystal material according to claim 4, wherein the component 2 consists essentially of a compound represented by formula (4):

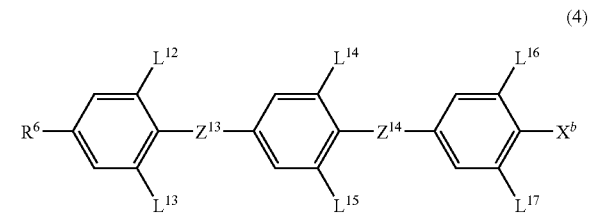

wherein:

$R^6$ is alkyl having 1 to 10 carbon atoms, wherein any —CH$_2$— in the alkyl can be substituted with —O—, —S—, —COO—, —OCO—, —CH=CH—, —CF=CF— or —C≡C—; and any hydrogen in the alkyl can be substituted with halogen;

$X^b$ is fluorine, chlorine, —CF$_3$, —OCF$_3$, —C≡C—CF$_3$ or —C≡C—CF$_3$;

$Z^{13}$ and $Z^{14}$ are each independently a single bond or —CF$_2$O—, wherein at least one of them is —CF$_2$O—; and $L^{12}$ to $L^{17}$ are each independently hydrogen, fluorine or chlorine.

20. The liquid crystal material according to claim 19, wherein:

$R^6$ is alkyl having 1 to 10 carbon atoms, wherein any —CH$_2$— nonadjacent to the aromatic ring in the alkyl can be substituted with —CH=CH—;

$X^b$ is fluorine, chlorine, —CF$_3$, —OCF$_3$ or —C≡C—CF$_3$;

$Z^{13}$ is a single bond and $Z^{14}$ is —CF$_2$O—; and $L^{12}$ to $L^{17}$ are each independently hydrogen or fluorine, wherein at least two of them are fluorine.

21. The liquid crystal material according to claim 2, wherein the chiral dopants included in the liquid crystal material comprise one or more compounds represented by any one of the following formulae (K1) to (K5):

(K1)
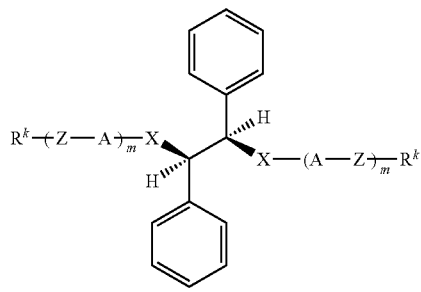

(K2)
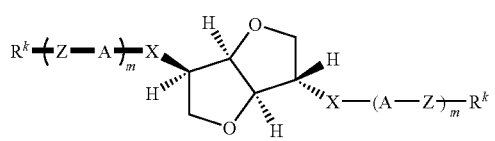

(K3)
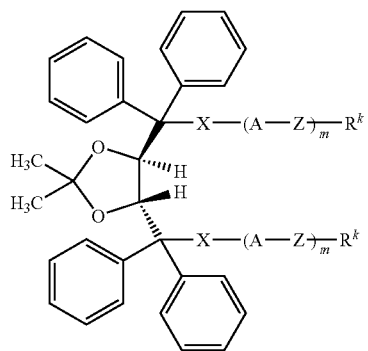

(K4)
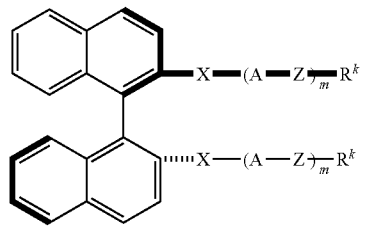

(K5)
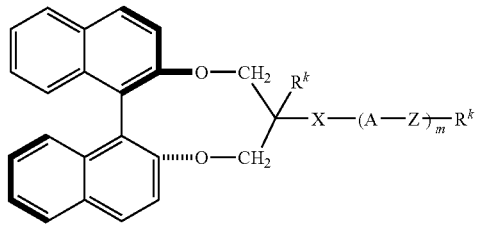

wherein:

each $R^K$ is independently hydrogen, halogen, —CN, —N=C=O, —N=C=S or alkyl having 1 to 20 carbon atoms, wherein any —CH$_2$— in the alkyl can be substituted with —O—, —S—, —COO—, —OCO—, —CH=CH—, —CF=CF— or —C≡C—; and any hydrogen in the alkyl can be substituted with halogen;

each A is independently an aromatic or nonaromatic 3- to 8-membered ring or a condensed ring having 9 or more carbon atoms, wherein any hydrogen in these rings can be substituted with halogen, alkyl having 1 to 3 carbon atoms or haloalkyl; —CH$_2$— in the rings can be substituted with —O—, —S— or —NH—; and —CH= can be substituted with —N=;

each Z is independently a single bond or alkylene having 1 to 8 carbon atoms, wherein any —CH$_2$— can be substituted with —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—; and any hydrogen can be substituted with halogen;

X is a single bond, —COO—, —OCO—, —CH$_2$O—, —OCH$_2$—, —CF$_2$O—, —OCF$_2$— or —CH$_2$CH$_2$—; and m is 1 to 4.

22. The liquid crystal material according to claim 2, wherein the chiral dopants included in the liquid crystal material comprises one or more compounds represented by any one of the following formulae (K2-1) to (K2-8) and (K5-1) to (K5-3):

(K2-1)
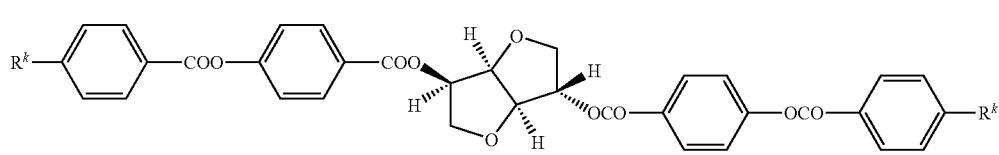

(K2-2)
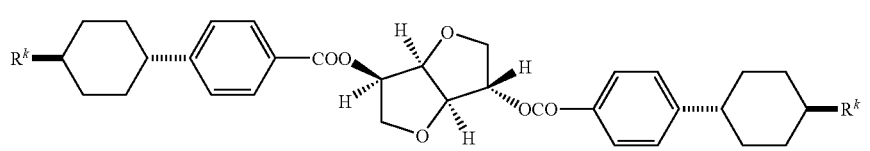

-continued

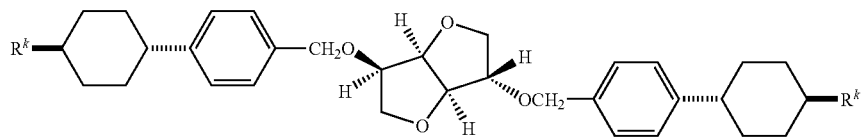
(K2-3)

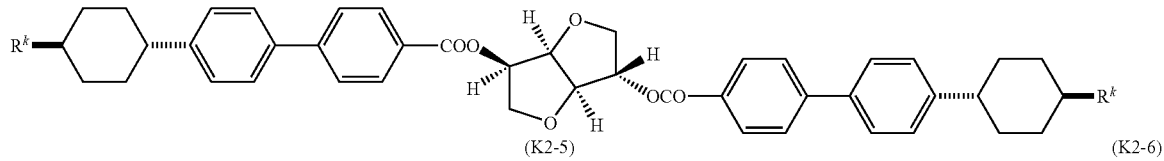
(K2-4)

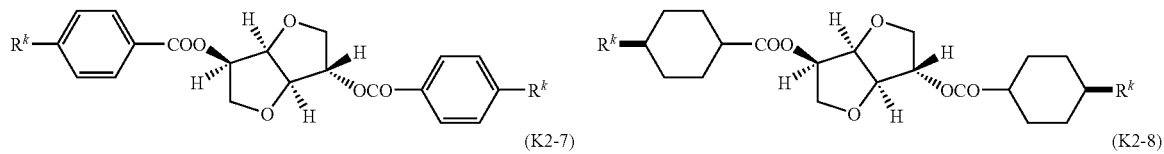
(K2-5) (K2-6)

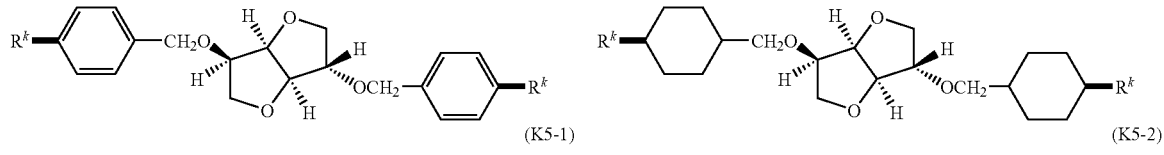
(K2-7) (K2-8)

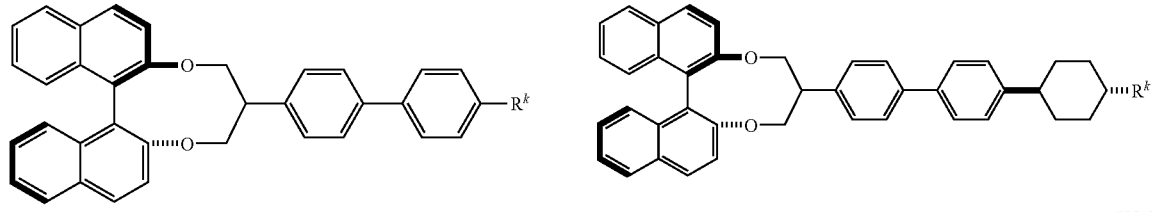
(K5-1) (K5-2)

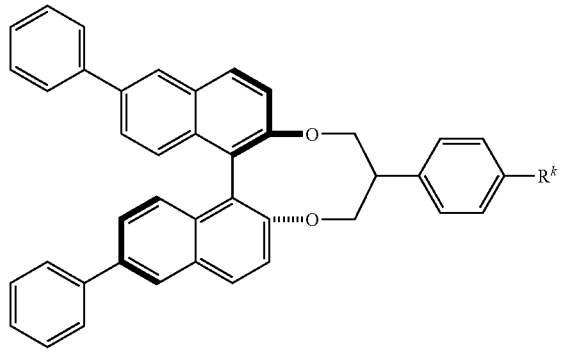
(K5-3)

wherein:
each $R^K$ is independently alkyl having 3 to 10 carbon atoms, wherein —CH$_2$— adjacent to the ring in the alkyl can be substituted with —O—; and any —CH$_2$— can be substituted with —CH=CH—.

23. The liquid crystal material according to claim 2, wherein the chiral dopants are included in an amount of approximately 1 to approximately 40 wt % per the weight of the liquid crystal composition B.

24. A mixture comprising the liquid crystal material according to claim 1 and a polymerizable monomer.

25. The mixture according to claim 24, wherein the polymerizable monomer is a photopolymerizable monomer or a thermopolymerizable monomer.

26. A polymer/liquid crystal composite for use in an element driven in a state of an optically isotropic liquid crystal phase, obtained by polymerizing the mixture according to claim 24.

27. The polymer/liquid crystal composite according to claim 26, wherein the mixture is obtained by polymerization in a state of an optically isotropic liquid crystal phase or an isotropic phase.

28. The polymer/liquid crystal composite according to claim 27, wherein a polymer included in the polymer/liquid crystal composite has a mesogenic moiety.

29. The polymer/liquid crystal composite according to claim 26, wherein the polymer included in the polymer/liquid crystal composite has a cross-linked structure.

30. The polymer/liquid crystal composite according to claim 26, comprising the liquid crystal material in an amount of approximately 60 to approximately 99 wt % and the polymer in an amount of approximately 1 to approximately 40 wt %.

31. The polymer/liquid crystal composite according to claim 26, wherein the pitch is approximately 700 nm or lower.

32. A liquid crystal element, in which an electrode is placed on one or both surfaces thereof, and which has a polymer/liquid crystal composite placed between substrates and an electric field applying means for applying electric field on the polymer/liquid crystal composite via the electrode, wherein the polymer/liquid crystal composite is that according to claim 26.

33. A liquid crystal element, in which an electrode is placed on one or both surfaces thereof, and which has: a pair of substrates, at least one of which is transparent; a polymer/liquid crystal composite placed between the substrates; and polarization plates placed on the external sides of the substrates, and which has an electric field applying means for applying electric field on the polymer/liquid crystal composite via the electrode, wherein the polymer/liquid crystal composite is the polymer/liquid crystal composite according to claim 26.

34. The liquid crystal element according to claim 32, wherein the electrode is constituted on at least one of the pair of substrates so that electric field can be applied in at least two directions.

35. The liquid crystal element according to claim 32, wherein the electrode is constituted on one or both of the pair of substrates placed in parallel with each other so that electric field can be applied in at least two directions.

36. The liquid crystal element according to claim 32, wherein the electrode is placed in a matrix state to constitute a pixel electrode; each pixel has an active element; and the active element is a thin film transistor (TFT).

* * * * *